(12) United States Patent
Umeda et al.

(10) Patent No.: US 7,084,645 B1
(45) Date of Patent: Aug. 1, 2006

(54) CAPACITANCE DETECTING CIRCUIT AND METHOD, AND FINGERPRINT SENSOR USING THE SAME

(75) Inventors: Yuichi Umeda, Miyagi-ken (JP); Junichi Saito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 97 days.

(21) Appl. No.: 10/986,499

(22) Filed: Nov. 10, 2004

(30) Foreign Application Priority Data

Nov. 25, 2003 (JP) .............................. 2003-394002

(51) Int. Cl.
*G01R 27/26* (2006.01)

(52) U.S. Cl. ....................... 324/686; 324/679

(58) Field of Classification Search ................. 324/686, 324/679
See application file for complete search history.

(56) References Cited

U.S. PATENT DOCUMENTS 5,175,802 A   12/1992   Crookshanks
5,633,594 A   5/1997    Okada
6,462,563 B1  10/2002   Kawahara et al.

FOREIGN PATENT DOCUMENTS

| DE | 19833210 A1 | 2/2000 |
| EP | 0612184 A2  | 8/1994 |
| EP | 0649116 A1  | 4/1995 |

*Primary Examiner*—Vincent Q. Nguyen
(74) *Attorney, Agent, or Firm*—Beyer, Weaver & Thomas, LLP.

(57) ABSTRACT

A capacitance detecting circuit includes a code generator for generating code having orthogonality in chronological order. A column-line driver drives the plurality of column lines based on the code by dividing the column lines into a first column line group and a second column line group. A capacitance detector, which is connected to the row line, converts the total of currents generated in capacitances at the intersections with the driven column lines into a voltage signal and outputs the converted voltage signal. A decoding computation unit determines the voltages corresponding to the capacitances at the intersections for each of the column line groups by performing product sum computation between the measured voltages and the code. The column-line driver drives the first column line group and the second column line group by complementary voltages according to the code or information indicating the inversion of the code.

11 Claims, 29 Drawing Sheets

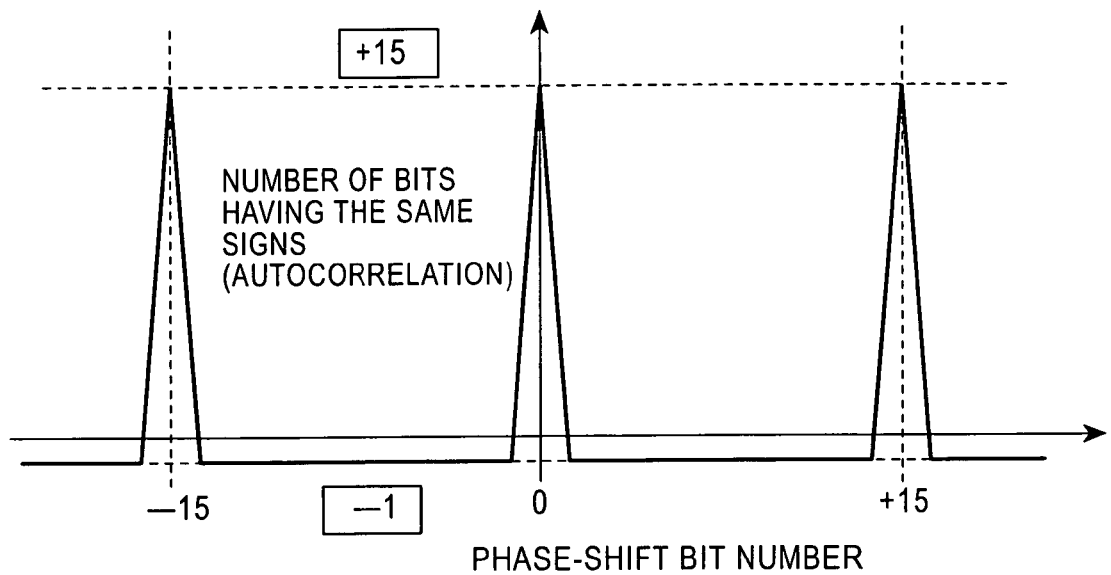

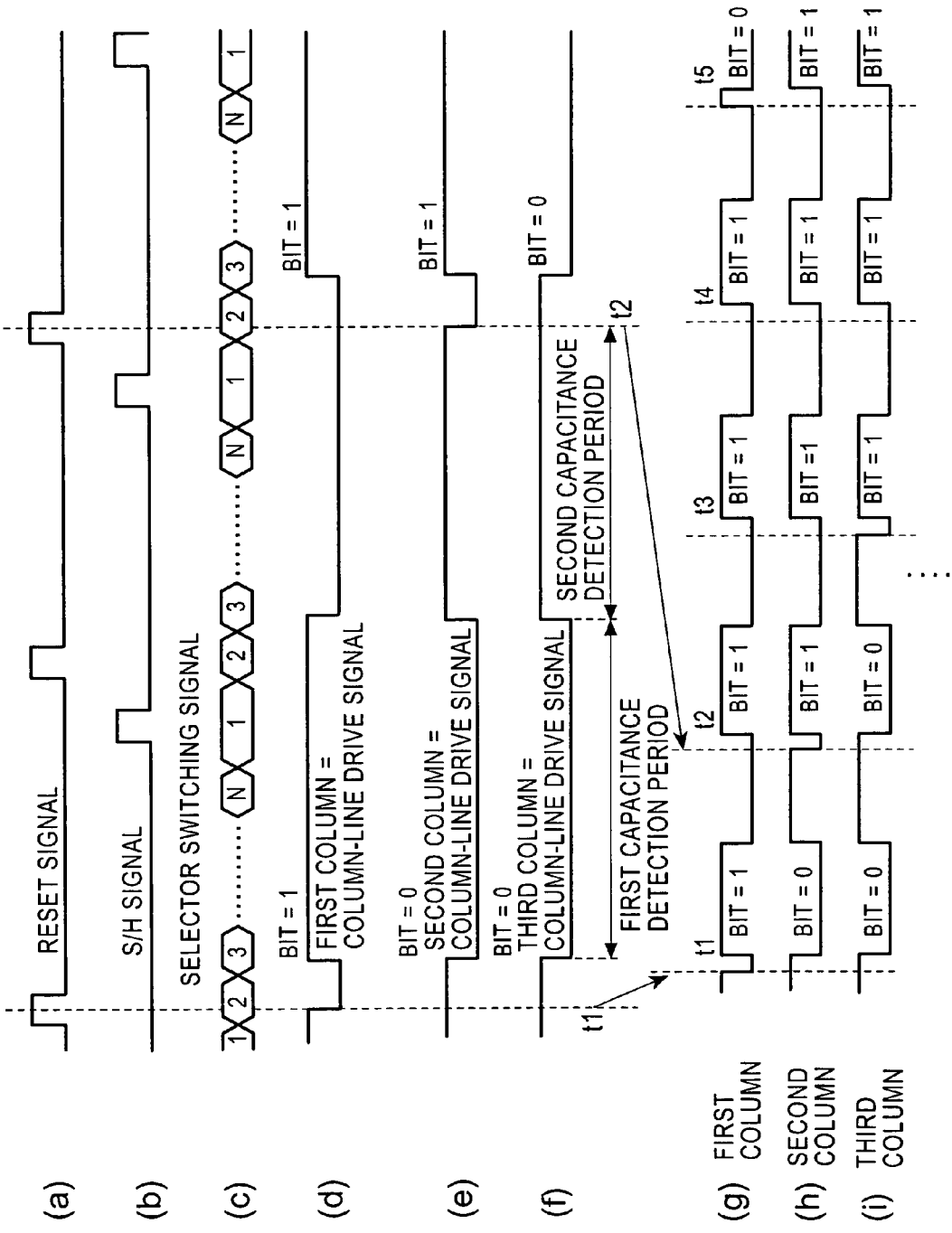

FIG. 14

| | 1 (LSB) | 2 | 3 | 4 | 5 | 6 | 7 | 8 | 9 | 10 | 11 | 12 | 13 | 14 | 15 (MSB) | SHIFT AMOUNT |
|---|---|---|---|---|---|---|---|---|---|---|---|---|---|---|---|---|
| t1 | 1 | 0 | 0 | 0 | 1 | 0 | 0 | 1 | 1 | 0 | 1 | 0 | 1 | 1 | 1 | 0 |
| t2 | 1 | 1 | 0 | 0 | 0 | 1 | 0 | 0 | 1 | 1 | 0 | 1 | 0 | 1 | 1 | 1 |
| t3 | 1 | 1 | 1 | 0 | 0 | 0 | 1 | 0 | 0 | 1 | 1 | 0 | 1 | 0 | 1 | 2 |
| t4 | 1 | 1 | 1 | 1 | 0 | 0 | 0 | 1 | 0 | 0 | 1 | 1 | 0 | 1 | 0 | 3 |
| t5 | 0 | 1 | 1 | 1 | 1 | 0 | 0 | 0 | 1 | 0 | 0 | 1 | 1 | 0 | 1 | 4 |
| t6 | 1 | 0 | 1 | 1 | 1 | 1 | 0 | 0 | 0 | 1 | 0 | 0 | 1 | 1 | 0 | 5 |
| t7 | 0 | 1 | 0 | 1 | 1 | 1 | 1 | 0 | 0 | 0 | 1 | 0 | 0 | 1 | 1 | 6 |
| t8 | 1 | 0 | 1 | 0 | 1 | 1 | 1 | 1 | 0 | 0 | 0 | 1 | 0 | 0 | 1 | 7 |
| t9 | 1 | 1 | 0 | 1 | 0 | 1 | 1 | 1 | 1 | 0 | 0 | 0 | 1 | 0 | 0 | 8 |
| t10 | 0 | 1 | 1 | 0 | 1 | 0 | 1 | 1 | 1 | 1 | 0 | 0 | 0 | 1 | 0 | 9 |
| t11 | 0 | 0 | 1 | 1 | 0 | 1 | 0 | 1 | 1 | 1 | 1 | 0 | 0 | 0 | 1 | 10 |
| t12 | 1 | 0 | 0 | 1 | 1 | 0 | 1 | 0 | 1 | 1 | 1 | 1 | 0 | 0 | 0 | 11 |
| t13 | 0 | 1 | 0 | 0 | 1 | 1 | 0 | 1 | 0 | 1 | 1 | 1 | 1 | 0 | 0 | 12 |
| t14 | 0 | 0 | 1 | 0 | 0 | 1 | 1 | 0 | 1 | 0 | 1 | 1 | 1 | 1 | 0 | 13 |
| t15 | 0 | 0 | 0 | 1 | 0 | 0 | 1 | 1 | 0 | 1 | 0 | 1 | 1 | 1 | 1 | 14 |

FIG. 20

(LSB) (MSB)

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| t1 | 1 | 0 | 1 | 0 | 1 | 0 | 1 | 0 | 1 | 0 | 1 | 0 | 1 | 0 | 1 |
| t2 | 0 | 1 | 1 | 0 | 0 | 1 | 1 | 0 | 0 | 1 | 1 | 0 | 0 | 1 | 1 |
| t3 | 1 | 1 | 0 | 0 | 1 | 1 | 0 | 0 | 1 | 1 | 0 | 0 | 1 | 1 | 0 |
| t4 | 0 | 0 | 0 | 1 | 1 | 1 | 1 | 0 | 0 | 0 | 0 | 1 | 1 | 1 | 1 |
| t5 | 1 | 0 | 1 | 1 | 0 | 1 | 0 | 0 | 1 | 0 | 1 | 1 | 0 | 1 | 0 |
| t6 | 0 | 1 | 1 | 1 | 1 | 0 | 0 | 0 | 0 | 1 | 1 | 1 | 1 | 0 | 0 |
| t7 | 1 | 1 | 0 | 1 | 0 | 0 | 1 | 0 | 1 | 1 | 0 | 1 | 0 | 0 | 1 |
| t8 | 0 | 0 | 0 | 0 | 0 | 0 | 0 | 1 | 1 | 1 | 1 | 1 | 1 | 1 | 1 |
| t9 | 1 | 0 | 1 | 0 | 1 | 0 | 1 | 1 | 0 | 1 | 0 | 1 | 0 | 1 | 0 |
| t10 | 0 | 1 | 1 | 0 | 0 | 1 | 1 | 1 | 1 | 0 | 0 | 1 | 1 | 0 | 0 |
| t11 | 1 | 1 | 0 | 0 | 1 | 1 | 0 | 1 | 0 | 0 | 1 | 1 | 0 | 0 | 1 |
| t12 | 0 | 0 | 0 | 1 | 1 | 1 | 1 | 1 | 1 | 1 | 1 | 0 | 0 | 0 | 0 |
| t13 | 1 | 0 | 1 | 1 | 0 | 1 | 0 | 1 | 0 | 1 | 0 | 0 | 1 | 0 | 1 |
| t14 | 0 | 1 | 1 | 1 | 1 | 0 | 0 | 1 | 1 | 0 | 0 | 0 | 0 | 1 | 1 |
| t15 | 1 | 1 | 0 | 1 | 0 | 0 | 1 | 1 | 0 | 0 | 1 | 0 | 1 | 1 | 0 |

ORTHOGONAL CODE (15×15)

FIG. 25

STORE IN MEMORY AS TIME-SERIES DATA di

| $d_1$ | = +Vs1−Vs2+Vs3−Vs4+Vs5−Vs6+Vs7−Vs8+Vs9−Vs10+Vs11−Vs12+Vs13—Vs14+Vs15 |
|---|---|
| $d_2$ | = −Vs1+Vs2+Vs3−Vs4−Vs5+Vs6+Vs7−Vs8−Vs9+Vs10+Vs11−Vs12−Vs13+Vs14+Vs15 |
| $d_3$ | = +Vs1+Vs2−Vs3−Vs4+Vs5+Vs6−Vs7−Vs8+Vs9+Vs10−Vs11−Vs12+Vs13+Vs14−Vs15 |
| $d_4$ | = −Vs1−Vs2−Vs3+Vs4+Vs5+Vs6+Vs7−Vs8−Vs9−Vs10−Vs11+Vs12+Vs13+Vs14+Vs15 |
| ⋮ | ⋮ |
| $d_{15}$ | = +Vs1+Vs2−Vs3+Vs4−Vs5−Vs6+Vs7+Vs8−Vs9−Vs10+Vs11−Vs12+Vs13+Vs14−Vs15 |

FIG. 26

DECODE BY PRODUCT SUM COMPUTATION
BETWEEN TIME-SERIES DATA di AND PN CODE

| $ds_1$ | = +d1−d2+d3−d4+d5−d6+d7−d8+d9−d10+d11−d12+d13−d14+d15 |
|---|---|
| $ds_2$ | = −d1+d2+d3−d4−d5+d6+d7−d8−d9+d10+d11−d12−d13+d14+d15 |
| $ds_3$ | = +d1+d2−d3−d4+d5+d6−d7−d8+d9+d10−d11−d12+d13+d14−d15 |
| $ds_4$ | = −d1−d2−d3+d4+d5+d6+d7−d8−d9−d10−d11+d12+d13+d14+d15 |
| ⋮ | ⋮ |
| $ds_{15}$ | = +d1+d2−d3+d4−d5−d6+d7+d8−d9−d10+d11−d12+d13+d14−d15 |

CAPACITANCE DETECTING CIRCUIT AND METHOD, AND FINGERPRINT SENSOR USING THE SAME

BACKGROUND OF THE INVENTION

1. Field of the Invention

The present invention relates to a capacitance detecting circuit and method for detecting a very small capacitance, and also to a fingerprint sensor using the same.

2. Description of the Related Art

As a known fingerprint sensor, which is considered to be most promising in biometrics techniques, the following type of pressure-sensitive capacitance sensor has been developed. Row lines and column lines are formed at predetermined intervals on the surfaces of two films, and the two films are disposed with a predetermined gap therebetween such that they face each other with an insulating film therebetween.

In this pressure-sensitive capacitance sensor, when a finger is placed on the sensor, the shape of the films are changed according to the ridges and valleys of the fingerprint, and accordingly, the intervals between the row lines and the column lines are changed. Thus, the shape of the fingerprint is detected as capacitances at the intersections of the row lines and the column lines.

In this type of sensor, to detect a capacitance of less than several hundred fF (femtofarads), a detecting circuit for converting the capacitance into an electrical signal by using a switched capacitor circuit is conventionally used. More specifically, in this sensor, a sensor capacitor device for detecting the capacitance of a subject by being driven by a first sensor drive signal and a reference capacitor device for generating a reference capacitance for the detecting circuit by being driven by a second sensor drive signal are connected to a common switched capacitor circuit. Then, first and second sample-and-hold circuits, which are alternately operating, sample the output signals of the sensor capacitor device and the reference capacitor device, and then determine the difference between the sampled signals, thereby obtaining a detection signal.

In this detecting circuit, a signal which is proportional to the capacitance Cs of the subject and which is inversely proportional to the feedback capacitance Cf can be stably detected by the common switched capacitor circuit. Additionally, the leakage (feedthrough) of electric charge Qd stored in a parasitic capacitance formed between the gate electrode of a reset switch (feedback control switch) of the switched capacitor circuit and the other electrodes to the these electrodes can be offset. Also, offset components of the reference potential of the switched capacitor circuit or low-frequency noise contained in the input signal can be removed to a certain degree by determining the difference between the sampled signals (for example, see Japanese Unexamined Patent Application Publication No. 8-145717 (paragraphs 0018–0052, FIGS. 1 through 4)).

It is demanded that a capacitance detecting circuit used in, for example, a fingerprint sensor, have high sensitivity since capacitance changes are very small. At the same time, however, the detecting circuit must have resistance to noise (including high-frequency noise) transmitted from a human body or noise from other circuitry.

It is also demanded that the capacitance detecting circuit is not vulnerable to crosstalk noise between adjacent row lines or column lines.

To satisfy these demands, the following type of capacitance detecting circuit can also be considered. At the rise of a column line, a charging voltage corresponding to the electric charge charged in the capacitor at the intersection between the row line and the corresponding column line is detected. Then, at the fall of the column line, a discharging voltage corresponding to the electric charge discharged from the capacitor at the intersection between the row line and the column line is detected. A change in the capacitance is then detected by using the charging voltage and the discharging voltage.

That is, in this capacitor detecting circuit, the difference voltage is determined by subtracting the discharging voltage from the charging voltage so as to detect a change in the capacitance. Accordingly, the voltage offset occurring at the same polarities caused by the feedthrough of an amplifying circuit or offset components generated in other circuits can be eliminated, thereby removing noise having much lower frequencies than the sampling frequency.

In regular detecting circuits including the above-described capacitance detecting circuits, to detect a capacitance change of each sensor device of a capacitance sensor, only a single column line is driven to detect a change in the capacitances Cs at the intersections between the column line and a plurality of row lines. As described above, a capacitance change per sensor device (one intersection) is very small, i.e., about several hundred fF.

Accordingly, in the known capacitor detecting circuits, even if offset components in the circuitry including the amplifying circuit are eliminated, the detecting circuit is influenced by noise originally superposed on the capacitor sensor.

Thus, in the capacitor detecting circuits, conducted noise transmitted to the capacitor sensor via a power supply or a human body is superposed on signals in the row lines and the column lines, thereby making it difficult to precisely detect a capacitance change due to this external disturbance noise.

In inverted fluorescent light, which is mainly used as current fluorescent light, a fluorescent lamp is switched ON by generating high frequencies by using semiconductors, causing noise having a fundamental frequency at a several dozens of KHz range.

In the above-described capacitor detecting circuits, the cycle of the sampling frequency for detecting capacitor changes when determining the difference between the charging voltage and the discharging voltage is close to the cycle of the fundamental frequency of the above-described noise.

Accordingly, in the capacitor detecting circuits, beat components caused by a frequency difference, that is, beat components (beat frequency) equal to the difference between two overlapped waves having very small frequency differences remain, and noise components due to the external disturbance cannot be completely removed.

Thus, when using a fingerprint sensor, if a device including a noise source having a frequency close to the sampling frequency of the capacitor detecting circuit, for example, the above-described inverted fluorescent light, is placed near the user, or if the fingerprint sensor is connected to a device having an inverter circuit used in backlight of a liquid crystal device, external disturbance noise caused by the above-described beat components cannot be completely eliminated. Accordingly, the signal-to-noise (S/N) ratio for detecting capacitance changes is reduced, thereby making it difficult to precisely read the fingerprint of the user.

SUMMARY OF THE INVENTION

Accordingly, in view of the above-described background, it is an object of the present invention to provide a capacitance detecting circuit and method in which the influence of external disturbance noise can be suppressed to improve the S/N ratio so that very small capacitances Cs and capacitance changes ΔCs of the capacitances Cs at intersections (sensor devices) between row lines and column lines can be detected at a sufficient sensitivity level, and also to provide a fingerprint sensor using the above-described capacitance detecting circuit and method.

In order to achieve the above object, the present invention provides a capacitance detecting circuit for detecting changes in capacitances at intersections between a plurality of column lines and a row line as voltages. The capacitance detecting circuit includes: a code generator for generating code having orthogonality in chronological order; a column-line driver for driving the plurality of column lines based on the code by dividing the column lines into a first column line group and a second column line group; a capacitance detector, which is connected to the row line, for converting the total of currents generated in capacitances at the intersections with the driven column lines into a voltage signal and outputting the converted voltage signal; and a decoding computation unit for determining the voltages corresponding to the capacitances at the intersections for each of the column line groups by performing product sum computation between the measured voltages and the code. In a period for detecting the capacitances, the column-line driver drives one of the first column line group and the second column line group to shift from a first voltage to a second voltage and drives the other one of the first column line group and the second column line group to shift from the second voltage to the first voltage according to the code or information indicating the inversion of the code.

With this configuration, in the capacitance detecting circuit of the present invention, signals from a plurality of column lines interesting with a row line are simultaneously driven by using code having orthogonality (pseudorandom noise (PN) code or orthogonal code, which is described below). More specifically, the column lines of the individual column line groups are complementarily driven based on the bit data of the code so as to simultaneously drive a plurality of sensor devices of each row line. Then, the capacitances Cs and the capacitance changes ΔCs to be detected are multiplexed, and the multiplexed values are changed as the capacitance N·Cs and N·ΔCs (N is the number of column lines simultaneously detected, i.e., the number of intersections multiplexed). The resulting capacitance is converted into a voltage as a detection signal. Accordingly, large capacitances and capacitance changes can be substantially measured. Thus, external disturbance noise, such as beat, can be relatively reduced so as to improve the S/N ratio, and the influence of crosstalk between the column lines can be excluded by using code exhibiting high autocorrelation, such as M-series PN code or Walsh orthogonal code.

Also in the capacitance detecting circuit of the present invention, the decoding computation unit decodes the multiplexed value into the capacitances Cs and the capacitance changes ΔCs of the individual sensor devices corresponding to each row line by performing product sum computation (predetermined computation) by using the same code as the code used for multiplexing. Accordingly, the detection result can be obtained with a resolution level similar to that for driving one column line.

In the aforementioned capacitance detecting circuit, the capacitance detector may detect the capacitances at the intersections of an area capacitance sensor in which a plurality of row lines are disposed in accordance with the plurality of column lines in a matrix. The capacitance detecting circuit can be used for a fingerprint sensor, in which case, high-precision determination results can be obtained. It is thus possible to provide a sensor exhibiting high operability.

In the aforementioned capacitance detecting circuit, the capacitance detector may detect the capacitances at the intersections of a line capacitance sensor in which a row line is disposed in accordance with the plurality of column lines. The capacitance detecting circuit can be used for a sensor for detecting the presence or absence or the roughness of the unevenness of the surface, in which case, the surface state of a subject can be detected with high precision. Additionally, since the line capacitance sensor is formed of only one row line, a small and inexpensive sensor can be provided.

The column-line driver may divide the period for detecting the capacitances into a first capacitance detection period and a second capacitance detection period, and in the first capacitance detection period, the column-line driver may drive the first column line group to rise from the first voltage to the second voltage and the second column line group to fall from the second voltage to the first voltage, and in the second capacitance detection period, the column-line driver may drive the first column line group to fall from the second voltage to the first voltage and the second column line group to rise from the first voltage to the second voltage.

With this configuration, in the capacitance detecting circuit of the present invention, by determining the difference of a detection signal at the rise of a column driving signal and a fall of the column driving signal for column lines, offset components in a differential amplifying circuit can be eliminated, thereby achieving higher-precision capacitance measurements.

The plurality of column lines may be divided into a plurality of column line groups, each having a predetermined number of column lines. The column-line driver may selectively change the plurality of column line groups at predetermined intervals in chronological order, and may drive the selected column line group by dividing the column lines into the first column line group and the second column line group based on the code without driving the column lines of the unselected column line groups.

With this arrangement, the number of column lines to be subjected to product sum computation can be set as desired so that the computation load can be adjusted. Accordingly, the processing can be performed in accordance with the performance of a system used.

In the capacitance detecting circuit of the present invention, the number of column lines to be driven can be set as desired so as to set column line groups having the number of column lines to be activated. Thus, the operation can be performed in accordance with the power consumption of the apparatus.

The code generator may generate PN code having autocorrelation, and sequentially shifts the phase of the PN code by one bit so as to output the PN code in chronological order as the code.

That is, the code generator generates PN code having high autocorrelation, for example, M-series PN code, and shifts the M-series PN code so as to multiplex the capacitance changes at the intersections. Then, decoding is performed by using the same PN code as that used for multiplexing, and thus, the occurrence of crosstalk between column lines can be suppressed, thereby making it possible to detect capacitance changes at the intersections with high precision.

Alternatively, the code generator may sequentially generate Walsh orthogonal code having different orders of bit strings so as to output the Walsh orthogonal code in chronological order as the code.

With this arrangement, the number of driving operations for the column lines is half the number of detecting operations. Accordingly, crosstalk between column lines can be suppressed, thereby detecting the capacitances at the intersections more precisely.

The column line group may include the number of column lines smaller than the number of bits of the code. The decoding computation unit may perform product sum computation by associating the column lines of the column line group with the bits at predetermined positions and by associating an imaginary column line with the remaining bit so as to decode the voltages corresponding to the capacitances at the intersections.

With this arrangement, measured data can be corrected by using the detection value of the imaginary column line, i.e., the reference value. Accordingly, in the measurements of the column line groups, information concerning DC components disappeared by complementarily driving can be compensated for, and variations in the measured data in the column line groups can be adjusted. Thus, the uniformity at the intersections of the overall matrix can be maintained.

More specifically, when the column lines are divided into a plurality of column line groups, at least one column line in each column line group remains unconnected. Then, the voltage signals divided in accordance with the intersections by the decoding computation unit are corrected by using a voltage signal corresponding to the unconnected intersection as the predetermined reference value.

The number of column lines may be set to be smaller than the number of bits of the code by one. The unoccupied bit is associated with the unconnected dummy column line and is used only for decoding processing. The column-line driver does not drive the dummy column line.

The present invention also provides a fingerprint sensor including the above-described capacitance detecting circuit. In this fingerprint sensor, capacitance changes at the intersections (sensor devices) can be detected while eliminating external noise, thereby achieving fingerprint taking with high precision.

As described above, according to the capacitance detecting circuit of the present invention, column lines driven by using code having orthogonality are multiplexed so as to simultaneously drive a plurality of column lines, thereby detecting the added capacitance of the capacitance changes at the plurality of intersections. Accordingly, the influence of external disturbance noise superposed on the row lines can be relatively reduced, thereby improving the detection sensitivity. Meanwhile, decoding is performed by using the same PN code or orthogonal code as the code used for multiplexing so as to determine the capacitance changes as the voltages at the intersections. Accordingly, the capacitance changes at the intersections can be detected with a resolution level similar to that for driving and detecting the signal output from a single column line.

BRIEF DESCRIPTION OF THE DRAWINGS

FIGS. 7A and 7B schematically illustrate autocorrelation of bit strings of pseudorandom noise (PN) code in every cycle as a result of performing bit shift (phase shift);

FIG. 8 is a timing chart illustrating the operation of the selector circuit and the operation for controlling column lines shown in FIG. 1 in the first embodiment;

FIG. 14 is a table indicating bit data of PN-code bit strings stored in a storage shift register as a result of performing one bit shift;

FIG. 20 is a table indicating Walsh code stored in a code memory shown in FIG. 18;

FIG. 25 schematically illustrates the relationship between the measured data di and voltage data Vsj in the second embodiment;

FIG. 26 schematically illustrates equations of product sum computation by the decoding computation circuit in the second embodiment;

DESCRIPTION OF THE PREFERRED EMBODIMENTS

Figure 1:
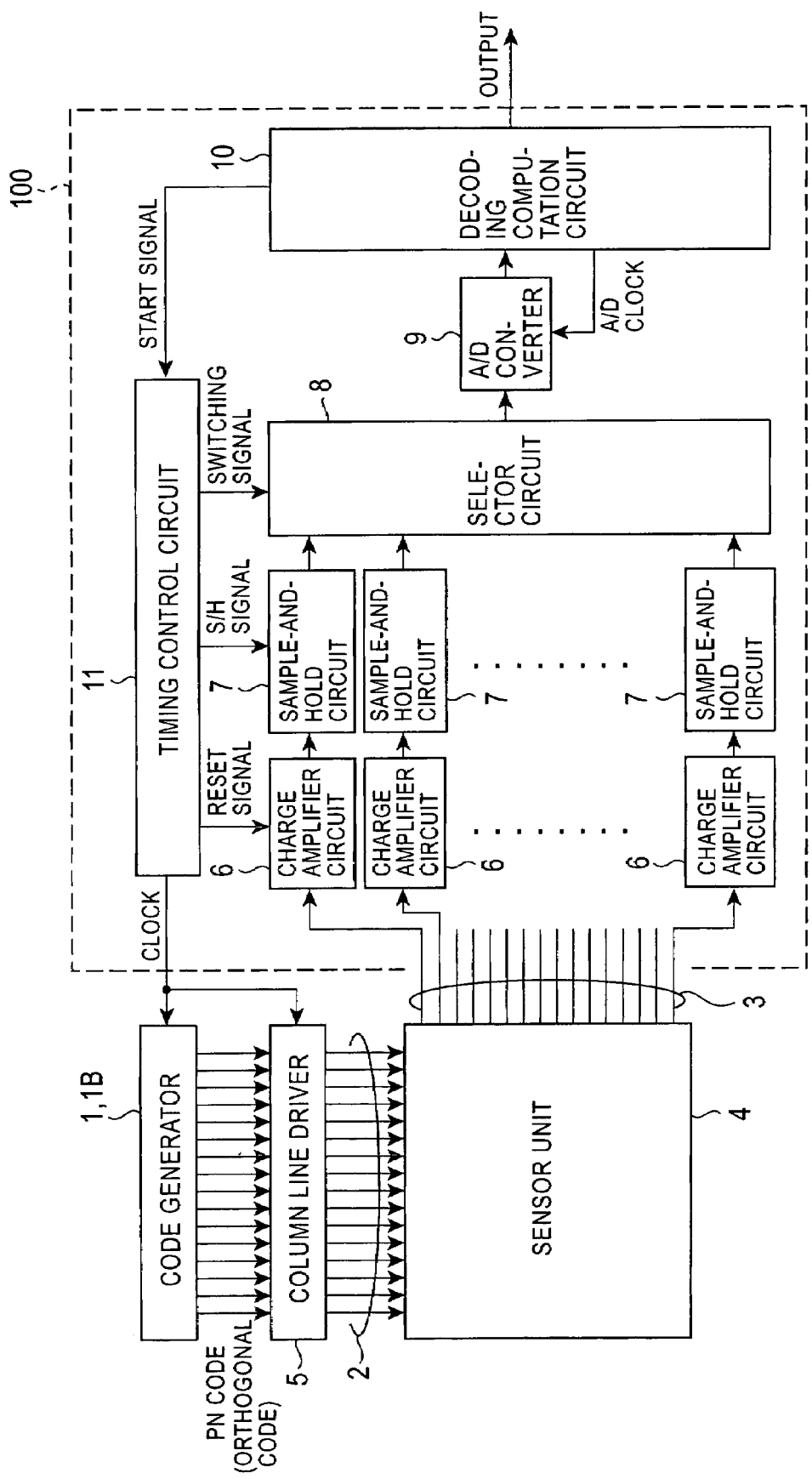
FIG. 1 is a block diagram illustrating the configuration of a fingerprint sensor using a capacitance detecting circuit constructed in accordance with a first or second embodiment of the present invention.

The present invention is described in detail below with reference to the accompanying drawings through illustration of preferred embodiments.

First Embodiment

A capacitor detecting circuit constructed in accordance with a first embodiment of the present invention is discussed below with reference to FIG. 1.

A code generator 1 generates pseudorandom noise (PN) code used for generating a column drive signal for driving the column lines of a column line set 2 of a sensor unit 4. As the PN code, M-series PN code having high autocorrelation is used. In the sensor unit 4, the column lines of the column line set 2 and row lines of a row line set 3 intersect with each other in a matrix, and the intersections form sensor devices (sensor devices 55 in FIG. 4).

Figure 2A:
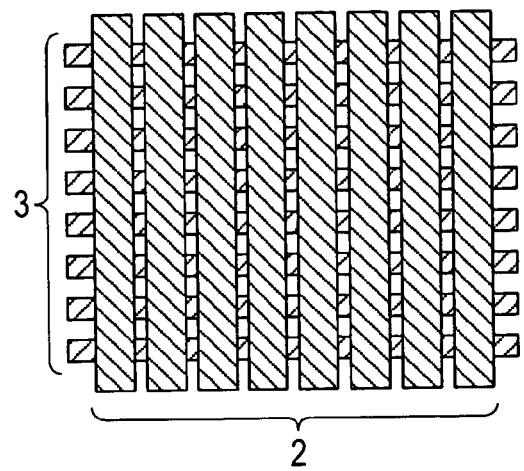
FIGS. 2A and 2B are a plan view and a sectional view, respectively, illustrating a sensor unit, which serves as an area sensor, shown in FIG. 1.
Figure 2B:
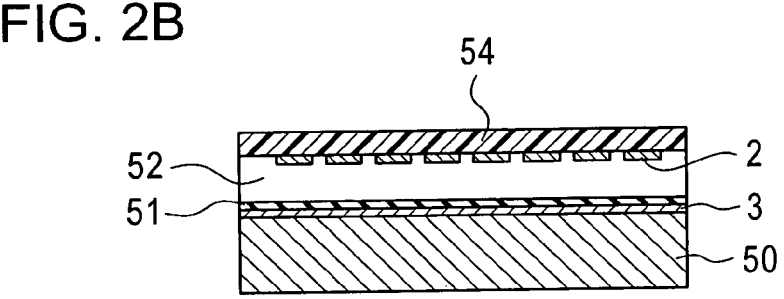

FIGS. 2A and 2B are a plan view and a sectional view, respectively, illustrating the sensor unit 4. As shown in FIG. 2A, the row lines of the row line set 3 and the column lines of a column line set 2 intersect with each other at a pitch of, for example, 50 μm. As shown in FIG. 2B, the row line set 3 consisting of a plurality or row lines are disposed on a substrate 50. An insulating film 51 is laminated on the surface of the row line set 3, and a film 54 is disposed on the surface of the insulating film 51 with a gap 52 therebetween. The column line set 2 is disposed on the lower surface of the film 54. The sensor devices 55 are formed as capacitor devices having a predetermined capacitance at the intersections between the row lines of the row line set 3 and the column lines of the column line set 2 with the gap 52 and the insulating film 51 therebetween.

Figure 3:
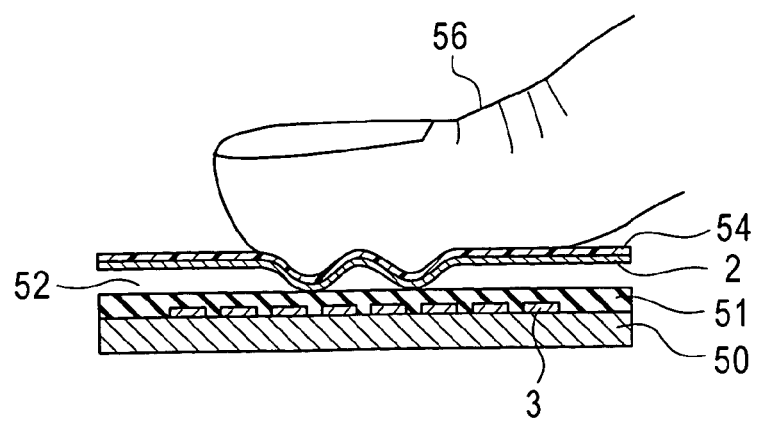
FIG. 3 schematically illustrates measurements of fingerprint data by using the sensor unit shown in FIG. 1.

When a finger 56 is placed on the sensor unit 4, the shapes of the film 54 and the column lines of the column line set 2 are changed, as shown in FIG. 3, in accordance with the ridges and valleys of the finger 56, and the gap 52 is changed accordingly. Then, the capacitances of the sensor devices 55 formed at the intersections between the row line set 3 and the column line set 2 are changed.

Figure 4:
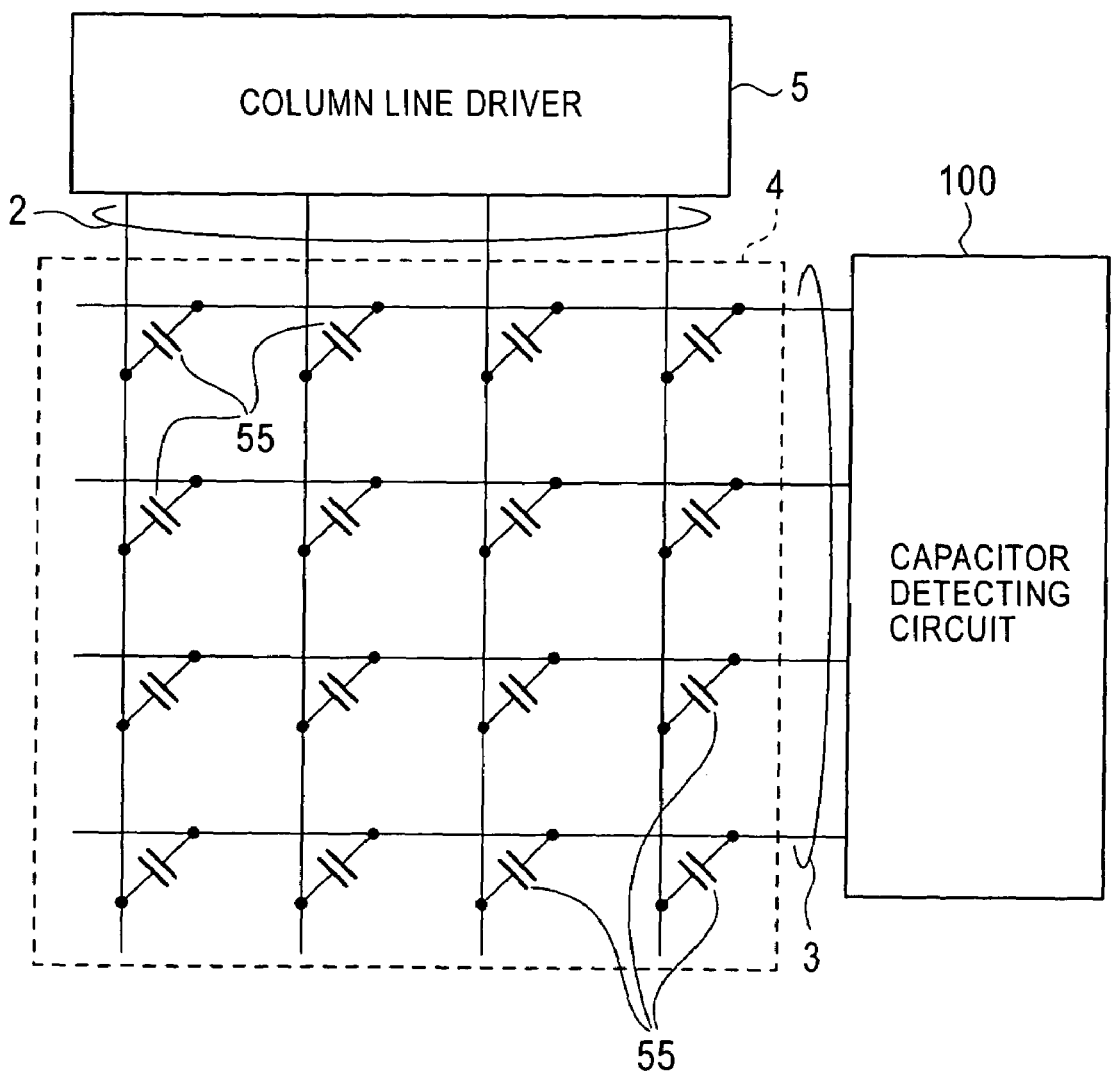
FIG. 4 schematically illustrates the configuration of sensor devices formed at the intersections of row lines of a row line set and column lines of a column line set in the sensor unit.

FIG. 4 schematically illustrates the matrix of the capacitor devices between the row lines and the column lines of the sensor unit 4. The sensor unit 4 is formed of the sensor devices 55, and a column line driver 5 and a capacitor detecting circuit 100 are connected to the sensor unit 4. The column line driver 5 outputs drive pulse trains to the column line set 2 in accordance with the order of the bit string of the above-described PN code. In other words, the column line driver 5 outputs predetermined drive pulses (drive signals) to the column lines of the column line set 2 of the sensor unit 4 in parallel with each other. The drive pulse patterns, indicating whether each column line is driven, of the drive pulse trains are generated based on the PN code, and drives (activates) the column lines of the column line set 2 according to the data of the PN-code bit string so as to multiplex capacitance changes of the intersections (sensor devices) between the driven column lines and each of the row lines.

Referring back to FIG. 1, the capacitance detecting circuit 100 includes charge amplifier circuits 6, sample-and-hold circuits 7, a selector circuit 8, an analog-to-digital (A/D) converter 9, a decoding computation circuit 10, and a timing control circuit 11.

The charge amplifier circuit 6, which is provided for each of the row lines of the row line set 3 of the sensor unit 4, detects a very small electric charge (current corresponding to a capacitance change) charged into and discharged from the intersections according to the capacitance based on the charging current and the discharging current. The charge amplifier circuit 6 amplifies the detected current, converts it to a voltage, and outputs it as a detection signal (measured voltage).

The sample-and-hold circuit 7, which is provided for each of the charge amplifier circuits 6, samples the measured voltages of the detection signals by the input of a sample-and-hold signal (S/H signal), and temporarily holds the measured voltages as voltage information. The selector circuit 8 switches the voltage information held in the sample-and-hold circuits 7 according to the order of the row lines, and outputs the rearranged voltage information to the A/D converter 9 in units of row lines.

The A/D converter 9 converts the measured voltage, which serves as analog voltage information, into digital measured data in synchronization with an A/D clock input from the decoding computation circuit 10, and outputs the digital data to the decoding computation circuit 10.

To achieve fast processing, the A/D converter 9 may be provided for each of the charge amplifier circuits 6 without providing the sample-and-hold circuits 7 so that the analog measured voltages can be converted into digital measured data.

The decoding computation circuit 10 performs computation on the digital measured data for removing offset components caused by the feedthrough by determining the difference between the measured data when the sensor device at the intersection is charged and the measured data when the sensor device is discharged. The decoding computation circuit 10 also decodes the multiplexed signal by performing product sum computation by using the same PN code as the PN code used for coding so as to demultiplex the multiplexed signal into voltage data components indicating the changed capacitances of the sensor devices.

In response to the input of a start signal indicating the start of the detection of capacitances from the decoding computation circuit 10, the timing control circuit 11 outputs clocks and control signals to the code generator 1, the column line driver 5, the charge amplifier circuits 6, the sample-and-hold circuits 7, and the selector circuit 8, thereby controlling the operation timing of the overall capacitance detecting circuit 100.

Each measurement period using the PN code has a first capacitance detection period and a second capacitance detection period in chronological order. In response to the input of the PN code from the code generator 1, in the first capacitance detection period, the column line driver 5 outputs a column-line drive signal corresponding to the bit data of the PN code to the column lines corresponding to the bit positions of the bit string of the PN code. Then, in the second capacitance detection period, the column line driver 5 outputs a column-line drive signal corresponding to the inverted data of the bits of the PN code to the column lines corresponding to the bit position of the bit string of the PN code.

For example, in the first capacitance detection period, when the bit data of the PN code is 1, the column line driver 5 drives the column line to shift (rise) from 0 (first voltage)

to 1 (second voltage). When the bit data of the PN code is 0, the column line driver 5 drives the column line to shift (fall) from 1 (second voltage) to 0 (first voltage).

Conversely, in the second capacitance detection period, to invert the data of the PN code, when the bit data of the PN code is 1, the column line driver 5 drives the column line to shift (fall) from 1 to 0, and when the bit data of the PN code is 0, the column line driver 5 drives the column line to shift (rise) from 0 to 1.

Figure 5:
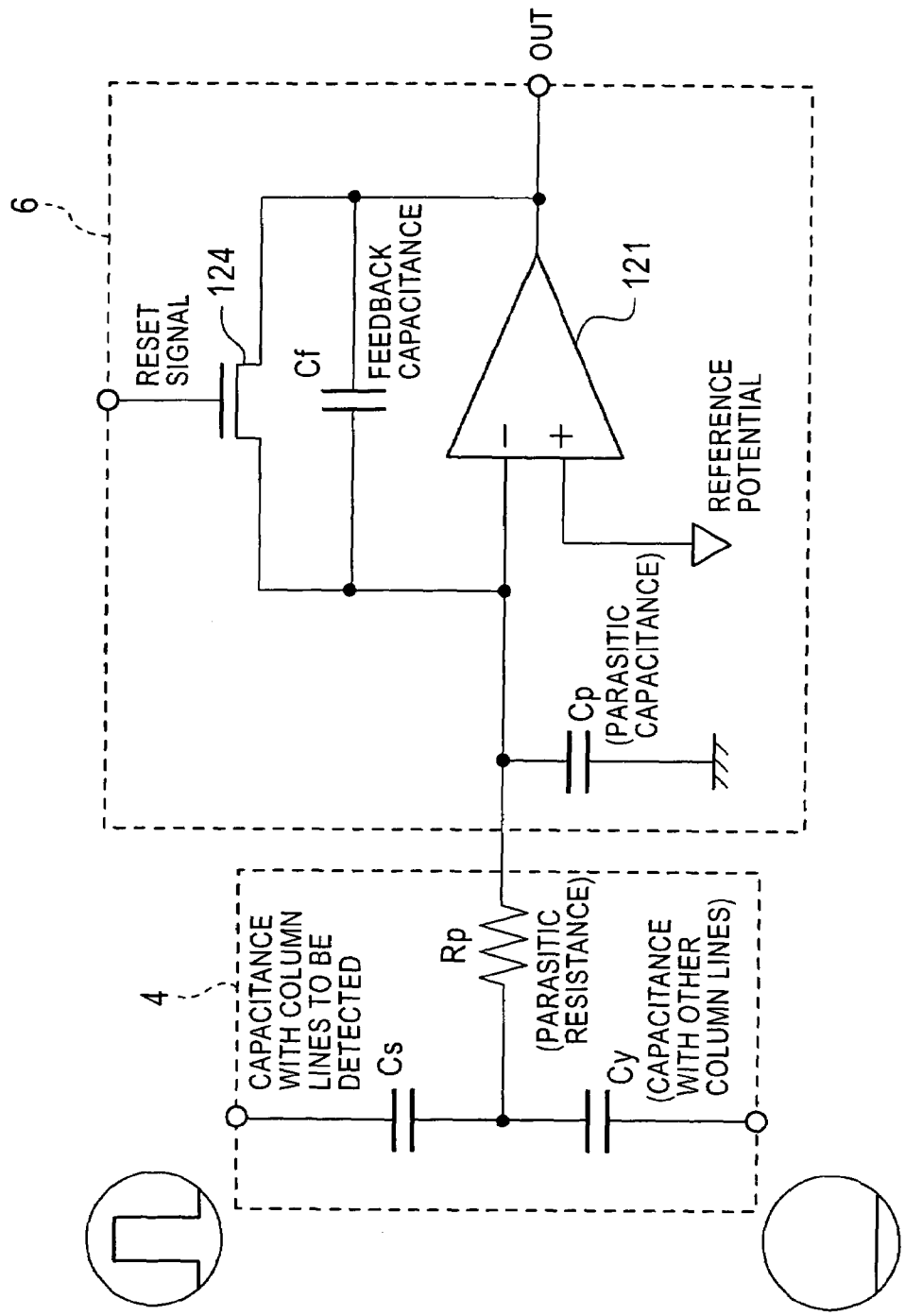
FIG. 5 schematically illustrates the sensor unit and a charge amplifier circuit shown in FIG. 1.

The configuration of the charge amplifier circuit 6 is discussed below with reference to FIG. 5. The charge amplifier circuit 6 includes, as shown in FIG. 5, an operational amplifier 121, a feedback capacitor Cf connected between the inverting input terminal and the output terminal of the operational amplifier 121, and an analog switch 124 for discharging electric charge stored in the feedback capacitor Cf. The non-inverting input terminal of the operational amplifier 121 is connected to a reference potential.

In FIG. 5, Cp indicates the parasitic capacitance of the operational amplifier 121, Cs represents the total of the capacitances of the sensor devices at the intersections with the column lines, and Cy designates the total of the capacitances of the sensor devices corresponding to the column lines other than the column lines to be detected.

An example of the operation of the capacitor detecting circuit 100 configured as described above is described below with reference to FIG. 1. For the sake of simplicity, in this operation, it is assumed that 15-bit length PN code is generated by a PN-code generating circuit 20, which is discussed below.

A signal indicating that the detection of capacitances is started, i.e., a fingerprint is to be taken by using the fingerprint sensor (sensor unit 4), is input into the decoding computation circuit 10.

The decoding computation circuit 10 outputs a start signal instructing the timing control circuit 11 to start detection. Then, the timing control circuit 11 outputs a clock signal and a reset signal to the code generator 1.

The code generator 1 then initializes a built-in four-stage linear feedback shift register (LFSR) by the reset signal, and generates M-series PN codes in synchronization with the clock signal and sequentially outputs them.

Figure 6A:
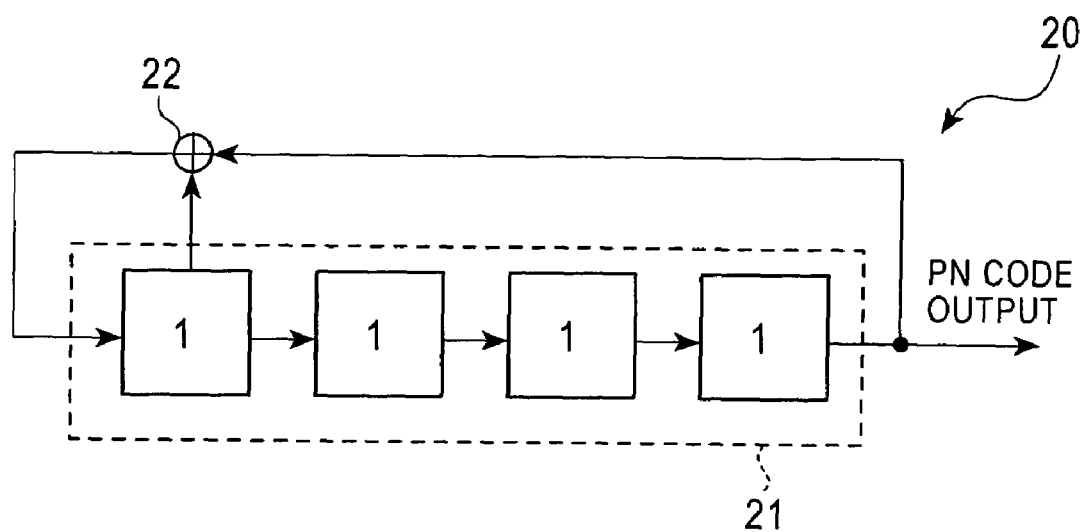
FIG. 6A illustrates the configuration of a code generating circuit of a code generator shown in FIG. 1.

The code generator 1 includes, for example, the PN-code generating circuit 20 shown in FIG. 6A, and outputs M-series PN code in synchronization with the clock. More specifically, the PN-code generating circuit 20 (also referred to as the "LFSR"), which generates M-series 15-bit PN code, is formed of a four-bit shift register 21 and an exclusive OR (hereinafter referred to as "EXOR") 22. The EXOR 22, which is connected to the output of tap 1 (the output of the first bit of the shift register 21) and the output of tap 4 (the output of the fourth bit of the shift register 21), performs an exclusive-OR operation on the input numerical values and outputs the computation results to the input of the shift register 21.

Figure 6B:
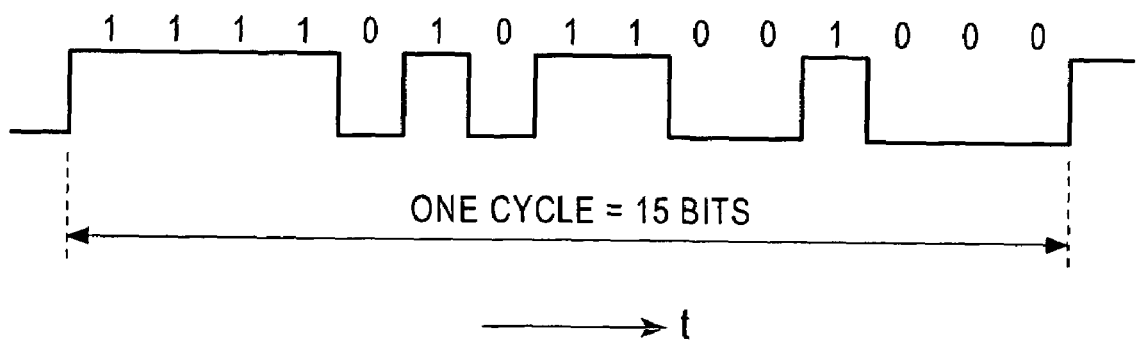
FIG. 6B illustrates an example of a data string of the code generated by the code generating circuit shown in FIG. 6A.

The PN-code generating circuit 20 shifts the bit data of the shift register 21 in synchronization with the clock signal so as to sequentially generate the bit string data of the PN code in chronological order in synchronization with the clock signal. The PN-code generating circuit 20 then writes the bit string data in the order of {1 (LSB), 1, 1, 1, 0, 1, 0, 1, 1, 0, 0, 1, 0, 0, 0 (MSB)} (in chronological order from the left to the right in FIG. 6B), as shown in FIG. 6B, into a built-in storage shift register 23 in chronological order in synchronization with the clock signal. That is, the PN-code generating circuit 20 outputs the PN code in the order from the LSB to the MSB in chronological order.

If the bit data is shifted in the cycle of 15 bits, as shown in FIG. 7A, i.e., if the bit string of the PN code has 15 bits, the maximum number of auto-correlated bits is +15 in every cycle in which the bit strings are in phase with each other, and the minimum number of auto-correlated bits is −1. In FIG. 7A, the vertical axis indicates autocorrelation (the number of auto-correlated bits (bits having the same signs), and the horizontal axis represents the bit number of the phase shift (one cycle of 15-bit shift). In the phase shift, bits are shifted from the initial bit string of PN code without rearranging the order of bits.

The PN-code bit string is compared, as shown in FIG. 7B, with a bit string generated by cyclically shifting the same PN-code bit string. When the two PN-code bit strings are in phase with each other, the number of auto-correlated bits computed by product sum processing is maximized (+15). In contrast, if the two PN-code bit strings are out of phase with each other, the number of auto-correlated bits computed by product sum processing is decreased one by one and is reduced to −1. The characteristic of this PN code is similar to the principle of multiplexing/demultiplexing in code division multiple access (CDMA) used in cellular telephones in which multiplexed information can be demultiplexed by using product sum computation when decoding it.

Measurements of the capacitances at the above-described intersections are as follows.

In response to PN code from the code generator 1, as shown in FIG. 8, during the measurement period of each of the times t1 to t15, i.e., during the measurement period of PN code having a predetermined phase, the column line driver 5 drives the corresponding column line by using the inverted data of the bits of the PN code according to a reset signal, which is output from the timing generating circuit 11 in synchronization of each time immediately before the first capacitance detection period.

Then, when the first capacitance detection period is reached after a predetermined time, the column line driver 5 drives the column lines by using the inverted data of the bit data set by the reset signal, that is, the original data of the PN code.

Then, when the second capacitance detection period is reached, the column line driver 5 drives the column lines by using the inverted data of the bit data of the PN code that drove the column lines in the first capacitance detection period. According to this operation, the column lines are sequentially driven complementarily in chronological order.

More specifically, if the PN code is {1, 1, 1, 1, 0, 1, 0, 1, 1, 0, 0, 1, 0, 0, 0}, as shown in FIG. 8, one cycle of the PN-code bit string consists of times t1 through t15 with regular intervals during which the bits are shifted in chronological order. Then, the PN-code bit string {1, 1, 1, 1, 0, 1, 0, 1, 1, 0, 0, 1, 0, 0, 0} generated by the PN-code generating circuit 20 is shifted in the storage shift register 23.

The storage shift register 23 has 15 registers, i.e., the registers $23_1$ through $23_{15}$ for storing one-bit data, and the data is shifted from the left (register 231) to the right (register $23_{15}$). More specifically, at time t1, the first bit (LSB) 1 of the PN-code bit string is input into the leftmost register $23_1$ of the storage shift register 23. Then, at time t2, the first bit 1 is shifted to the register $23_2$, and the second bit 1 of the PN-code bit string is input into the register $23_1$.

As a result of performing the above-described operation at times t1, t2, . . . , and t15, the PN-code bit string {1, 1, 1, 1, 0, 1, 0, 1, 1, 0, 0, 1, 0, 0, 0} can be circulated in the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$. The data stored in the registers $23_{15}$, $23_{14}$, $23_{13}$, $23_{12}$, $23_{11}$, $23_{10}$, $23_9$, $23_8$, $23_7$, $23_6$, $23_5$, $23_4$, $23_3$, $23_2$, and $23_1$ are supplied to driver circuits $5_{15}$, $5_{14}$, $5_{13}$, $5_{12}$, $5_{11}$, $5_{10}$, $5_9$, $5_8$, $5_7$, $5_6$, $5_5$, $5_4$, $5_3$, $5_2$, $5_1$, respectively. At the end of the shifting operation (t1 through t15), the PN-code bit string {1, 1, 1, 1, 0, 1, 0, 1, 1, 0, 0, 1, 0, 0, 0} is supplied to the driver circuits $5_{15}$, $5_{14}$, $5_{13}$, $5_{12}$, $5_{11}$, $5_{10}$, $5_9$, $5_8$, $5_7$, $5_6$, $5_5$, $5_4$, $5_3$, $5_2$, $5_1$, respectively. The operation from t1 to t15 corresponds to one cycle of the fingerprint-taking operation of the present invention.

The operation of the storage shift register 23 in the actual fingerprint-taking operation is discussed below with reference to FIGS. 9 through 12. In FIGS. 9 through 12, the numbers indicated in the registers $23_1$ through $23_{15}$ of the storage shift register 23 represent the bit data stored in the registers $23_1$ through $23_{15}$. The numbers indicated in inverting portions $24_1$ through $24_{15}$ of an inverting circuit 24 represent data inverted from the data stored in the registers $23_1$ through $23_{15}$ and to be supplied to the column line driver 5.

In response to a signal indicating the start of fingerprint taking, 15 clock signals are output from the timing control circuit 11, and the PN-code generating circuit 20 generates the PN code having a first phase. As the initial state, the data bits {1 (MSB), 1, 1, 1, 0, 1, 0, 1, 1, 0, 0, 1, 0, 0, 0 (LSB)} are stored in the registers $23_{15}$ through $23_1$, respectively, of the storage shift register 23.

Figure 9:
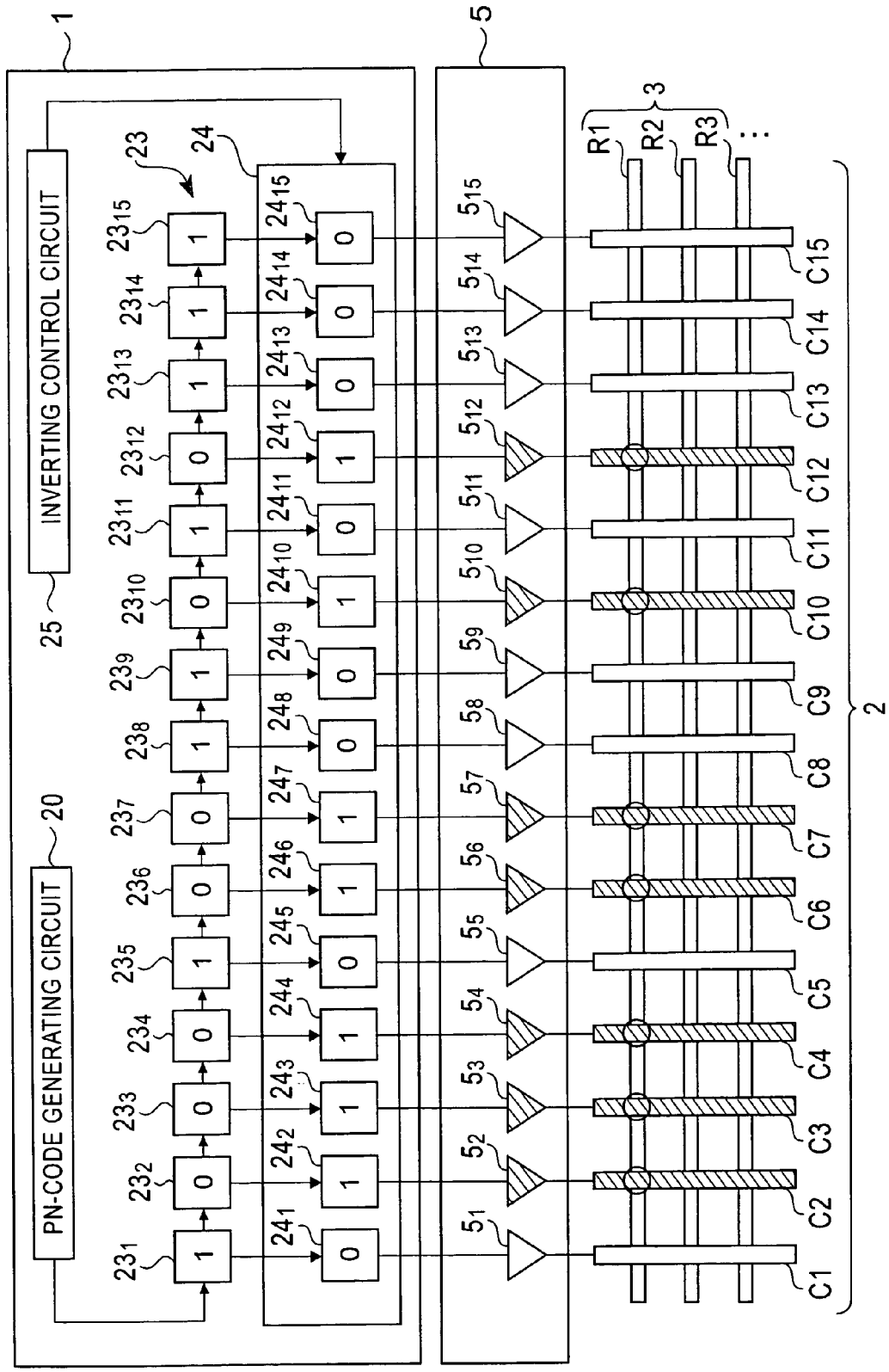
FIGS. 9 through 11 illustrate operations for driving column lines by using PN code and multiplexing the capacitances of the sensor devices according to the first embodiment of the present invention.

Then, at time t1 at the start of the cycle of the fingerprint-taking operation, the timing control circuit 11 outputs a clock so as to shift the registers $23_{15}$ through $23_1$ by one bit, resulting in the data string {1, 1, 1, 0, 1, 0, 1, 1, 0, 0, 1, 0, 0, 0, 1}, as shown in FIG. 9.

The inverting portions $24_1$ through $24_{15}$ of the inverting circuit 24 are connected to the driver circuits $5_1$ through $5_{15}$ of the column line driver 5 so as to output the inverted data to the corresponding driver circuits $5_1$ through $5_{15}$.

When a reset signal is input at time t1, an inverting control circuit 25 outputs a control signal for causing the inverting circuit 24 to invert the data output from the storage shift register 23 and output them.

Accordingly, the inverting circuit 24 inverts, as shown in FIG. 9, the data input from the registers $23_1$ through $23_{15}$ of the storage shift register 23 by using the inverting portions $24_1$ through $24_{15}$, that is, the inverting circuit 24 inverts the bit string {1, 1, 1, 0, 1, 0, 1, 1, 0, 0, 1, 0, 0, 0, 1} into {0, 0, 0, 1, 0, 1, 0, 0, 1, 1, 0, 1, 1, 1, 0} and outputs the inverted data to the driver circuit 5.

Then, the driver circuit 5 drives the corresponding column lines based on the bit string {0, 0, 0, 1, 0, 1, 0, 0, 1, 1, 0, 1, 1, 1, 0} input from the inverting portions $24_{15}$ through $24_1$.

Then, in the column lines C1 through C15, column lines C2, C3, C4, C6, C7, C10, and C12 are shifted as a second column line group to the second voltage (predetermined voltage at H level) in accordance with the bit data 1, while column lines C1, C5, C8, C9, C11, C13, C14, and C15 are shifted as a first column line group to the first voltage (predetermined voltage at L level) in accordance with the bit data 0.

Referring back to FIG. 8, after a predetermined lapse of time after the input of the reset signal at time t1, that is, when the first capacitance detection period is reached, the inverting control circuit 25 outputs a control signal for causing the inverting circuit 24 to output the data from the storage shift register 23 without inverting it.

Figure 10:
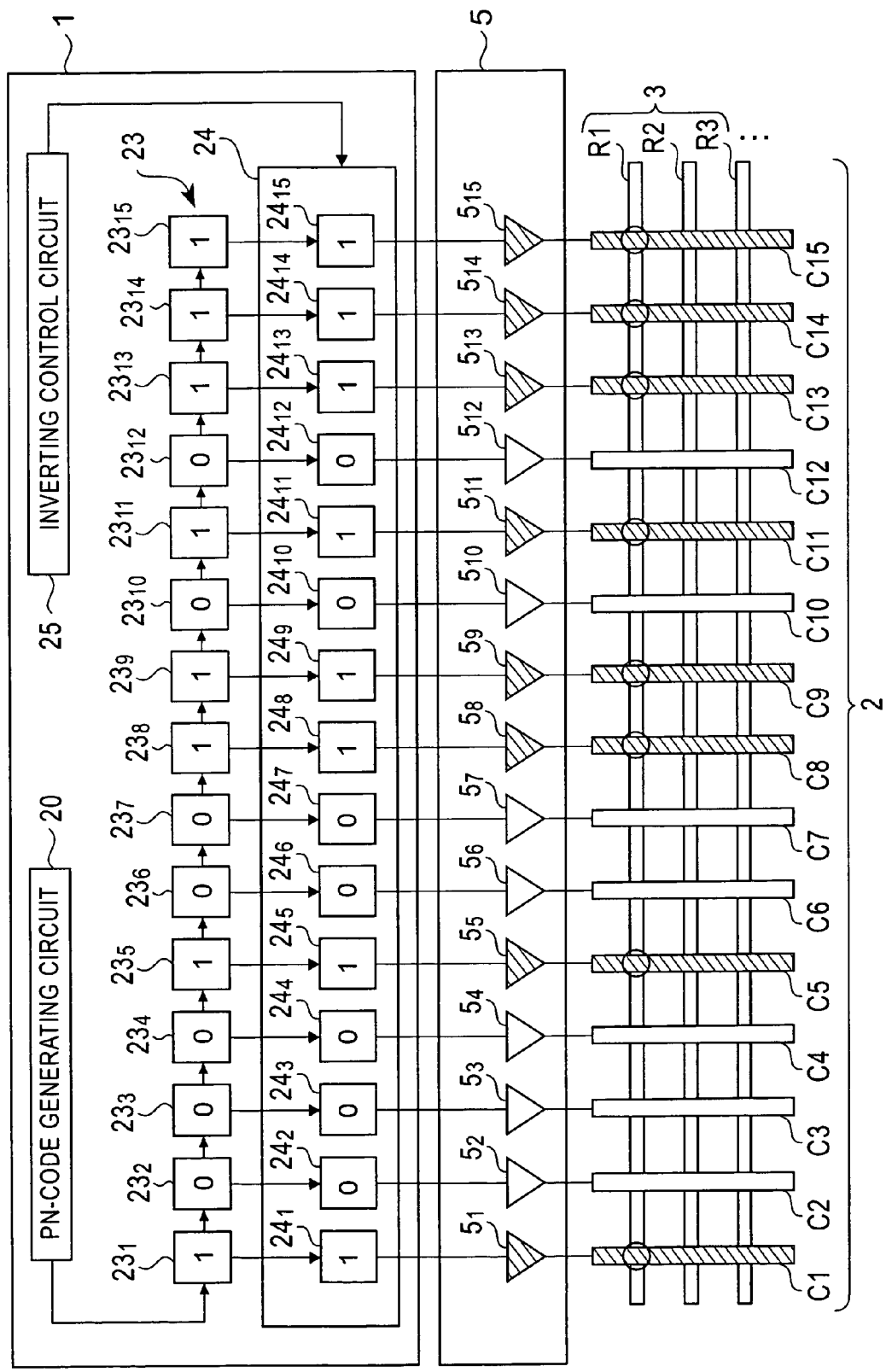

Accordingly, in the first capacitance detection period, in response to the control signal, the inverting circuit 24 changes, as shown in FIG. 10, from the bit string {0, 0, 0, 1, 0, 1, 0, 0, 1, 1, 0, 1, 1, 1, 0} output from the inverting portions $24_1$ through $24_{15}$ into the bit string {1, 1, 1, 0, 1, 0, 1, 1, 0, 0, 1, 0, 0, 0, 1}.

In this case, the column line driver 5 drives the column line C1 to rise from the first voltage to the second voltage since the 15-bit data is changed from 0 to 1; the column line driver 5 drives the column line C2 to fall from the second voltage to the first voltage since the 14-bit data is changed from 1 to 0; the column line driver 5 drives the column line C3 to fall from the second voltage to the first voltage since the 13-bit data is changed from 1 to 0; and the column line driver 5 drives the other column lines C4 through C15 in accordance with changes in the data at the corresponding bit positions.

Figure 13:
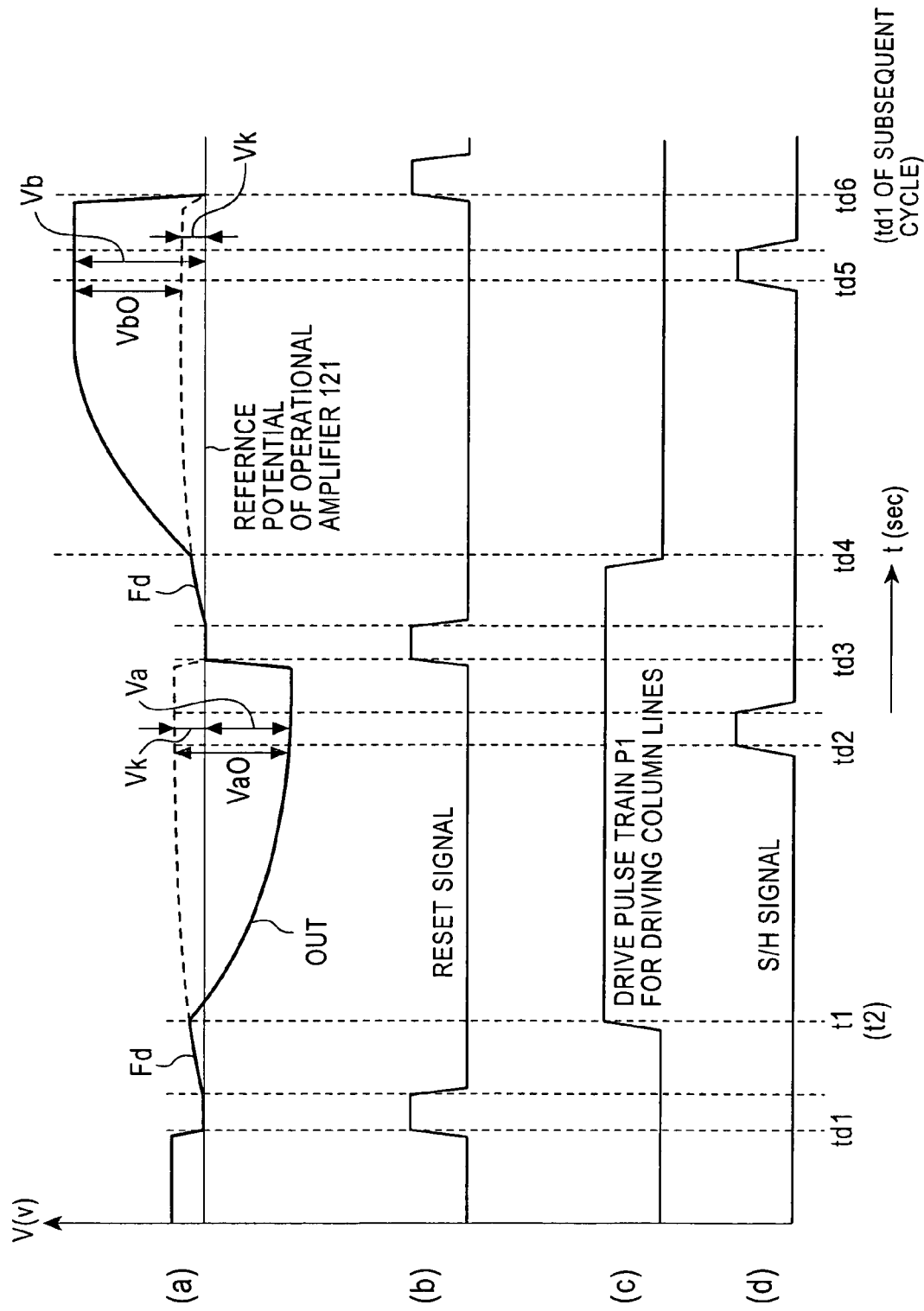
FIG. 13 is a timing chart illustrating a detection signal and the operation of the charge amplifier circuits in the first embodiment.

That is, the column line driver 5 drives the column lines C15, C14, C13, C12, C11, C10, C9, C8, C7, C6, C5, C4, C3, C2, and C1 by the driver circuits $5_{15}$, $5_{14}$, $5_{13}$, $5_{12}$, $5_{11}$, $5_{10}$, $5_9$, $5_8$, $5_7$, $5_6$, $5_5$, $5_4$, $5_3$, $5_2$, $5_1$, respectively, according to drive pulses having predetermined regular pulse widths based on the clock signal output from the timing control circuit 11 (see (d) through (i) of FIG. 8 and (b) of FIG. 13).

Accordingly, in the first capacitance detection period, according to the predetermined drive pulses corresponding to the column lines, the column lines C1, C5, C8, C9, C11, C13, C14, and C15 are driven as the first column line group by the second voltage, while the column lines C2, C3, C4, C6, C7, C10, and C12 are driven as the second column line group by the first voltage.

Then, the total capacitance in the capacitor sensors at the intersections between the driven column lines and each of the row lines R1 through R15, i.e., the capacitance multiplied by the PN-code bit string, is connected to each of the corresponding row lines R1 through R15, respectively (FIG. 10).

Then, currents based on the charge transfer in the capacitances multiplied by the above-described column-line driving operation flow in the row lines, and the charge amplifier circuits 6 convert the currents into voltages and output them as measured voltages. Then, the sample-and-hold circuits 7 sample and hold the voltages in response to an S/H signal from the timing control circuit 11.

Then, after sampling the measured voltages corresponding to the multiplexed capacitances in the first capacitance detection period, the timing control circuit 11 outputs a reset signal to the charge amplifier circuits 6.

When the analog switch 124 shown in FIG. 5 is turned ON in response to the input of the reset signal, the output terminal and the inverting input terminal of the operational amplifier 121 are short-circuited to set the operational amplifier 121 in the driving state, as in a voltage follower, that is, the output terminal and the inverting input terminal become substantially at the reference potential. Accordingly, the row line also becomes at the reference potential, and the voltage output from the output terminal of the operational amplifier 121 does not significantly change even if the driving states of the column lines are changed.

Referring to FIG. 8, after a predetermined lapse of time, i.e., when the second capacitance detection period is reached after the first capacitance detection period, the inverting control circuit 25 outputs a control signal for causing the inverting circuit 24 to invert the data output from the storage shift register 23 and output them under the control of the timing control circuit 11.

Accordingly, in the second capacitance detection period, as shown in FIG. 9, in response to the above-described control signal, the inverting circuit 24 changes the bit string {1, 1, 1, 0, 1, 0, 1, 1, 0, 0, 1, 0, 0, 0, 1} supplied to the inverting portions $24_{15}$ through $24_1$ to the bit string {0, 0, 0, 1, 0, 1, 0, 0, 1, 1, 0, 1, 1, 1, 0}.

In this case, the column line driver 5 drives the column line C1 to fall from the second voltage to the first voltage since the 15-bit data is changed from 1 to 0; the column line driver 5 drives the column line C2 to rise from the first voltage to the second voltage since the 14-bit data is changed from 0 to 1; the column line driver 5 drives the column line C3 to rise from the first voltage to the second voltage since the 13-bit data is changed from 0 to 1; and the column line driver 5 drives the other column lines C4 through C15 in accordance with changes in the data at the corresponding bit positions.

That is, the column line driver 5 drives the column lines C15, C14, C13, C12, C11, C10, C9, C8, C7, C6, C5, C4, C3, C2, and C1 by the driver circuits $5_{15}$, $5_{14}$, $5_{13}$, $5_{12}$, $5_{11}$, $5_{10}$, $5_9$, $5_8$, $5_7$, $5_6$, $5_5$, $5_4$, $5_3$, $5_2$, $5_1$, respectively, according to drive pulses having predetermined regular pulse widths based on the clock signal output from the timing control circuit 11 (see (d) through (i) of FIG. 8 and (b) of FIG. 13).

Accordingly, in the first capacitance detection period, according to the predetermined drive pulses corresponding to the column lines, the column lines C2, C3, C4, C6, C7, C10, and C12 are driven as the first column line group by the second voltage, while the column lines C1, C5, C8, C9, C11, C13, C14, and C15 are driven as the second column line group by the first voltage.

Then, the total capacitance in the capacitor sensors at the intersections between the driven column lines and each of the row lines R1 through R15, i.e., the capacitance multiplied by the PN-code bit string, is connected to each of the corresponding row lines R1 through R15, respectively (FIG. 9).

Then, currents based on the charge transfer in the capacitances multiplied by the above-described column-line driving operation flow in the row lines, and the charge amplifier circuits 6 convert the currents into voltages and output them as measured voltages. Then, the sample-and-hold circuits 7 sample and hold the voltages in response to an S/H signal from the timing control circuit 11.

Then, after sampling the measured voltages corresponding to the multiplexed capacitances in the second capacitance detection period, the timing control circuit 11 outputs a reset signal (at time t2) to the charge amplifier circuits 6.

The timing control circuit 11 outputs a clock to the code generator 1 in synchronization with the output of the reset signal.

In the code generator 1, the PN-code generating circuit 20 outputs one bit (data 1). The storage shift register 23 shifts the individual bits stored in the registers $23_1$ through $23_{14}$ to the registers $23_2$ through $23_{15}$, respectively, and the above-described one bit data output from the PN-code generating circuit 20 is input into the register $23_1$, which is substantially similar to the case where the data in the register $23_{15}$ is input into the register $23_1$.

Accordingly, the data bits in the registers $23_1$ through $23_{15}$ are circulated by one bit, with the result that PN code having a new phase is stored in the storage shift register 23.

The timing control circuit 11 outputs a reset signal, as indicated by (a) of FIG. 8 and (b) of FIG. 13, to the charge amplifier circuits 6 slightly before the end of the first or second capacitance detection period to change the column lines to measure the capacitance in the subsequent measurement period. The timing control circuit 11 also outputs an S/H signal to the sample-and-hold circuits 7 slightly before the reset signal, as indicated by (b) of FIG. 8 and (d) of FIG. 13.

The timing control circuit 11 sequentially outputs N switching signals (N is the number of sample-and-hold circuits 7) to the selector circuit 8 at intervals during which S/H signals are sequentially input.

Accordingly, the signals held in the sample-and-hold circuits 7 by one S/H signal are sequentially supplied, as indicated by (c) of FIG. 8, to the A/D converter 9 via the selector circuit 8 before the subsequent S/H signal is input. The A/D converter 9 then converts the measured voltage of the detection signal of each row line to digital data in synchronization with an A/D clock input from the decoding computation circuit 10, and outputs the digital data to the decoding computation circuit 10 as measured data d1. The decoding computation circuit 10 then writes the data string of the measured data into a built-in memory for each row line.

Details of the operation of the charge amplifier circuits 6 are given below. In response to a reset signal output from the timing control circuit 11 at time td1, which is slightly before time t1 shown in FIG. 13, the analog switch 124 (MOS transistor in FIG. 5) is turned ON to discharge the feedback capacitance Cf. This causes the output OUT and the inverting input terminal of the operational amplifier 121 to be short-circuited, and thus, the operational amplifier 121 becomes at the reference potential. The row line connected to the inverting input terminal of the operational amplifier 121 also becomes at the reference potential.

Then, when the reset signal is turned OFF, the output voltage of the operational amplifier 121 is slightly raised due to the feedthrough of the gate parasitic capacitance of the analog switch 124 (see Fd after time td1 in (a) of FIG. 13).

Then, in the first capacitance detection period of the measurement period started at time t1, in accordance with the PN-code bit patterns (the order of bit strings) of the drive pulses (column-line drive signals: drive pulses indicated by (d) through (i) of FIG. 8), the column lines of the first and second column line groups are driven to rise from the first voltage to the second voltage or to fall from the second voltage to the first voltage. Then, the drive pulse is applied to the inverting input terminal of the operational amplifier 121 via the sensor devices (capacitance Cs) at the intersections between the column lines and the row line, and due to the current flowing based on the voltage of this drive pulse, the voltage of the output OUT of the operational amplifier 121 is gradually decreased or increased, as indicated in (a) of FIG. 13.

The waveforms shown in FIG. 13 are indicated when the PN code is 1. When the PN code is 0, the waveform in time td4 through td6 and the waveform in time td1 through td3 are inverted.

Then, at time td2, the timing control circuit 11 outputs an S/H signal to the sample-and-hold circuit 7. In response to the S/H signal, the sample-and-hold circuit 7 holds the measured voltage Va output from the output OUT of the operational amplifier 121 of the charge amplifier circuit 6.

Then, at time td3, the timing control circuit 11 again outputs a reset signal to the charge amplifier circuit 6. This causes the output OUT and the inverting input terminal of the operational amplifier 121 to be short-circuited, and the feedback capacitor Cf is discharged, thereby allowing the output OUT of the operational amplifier 121 to return to the reference potential. When the reset signal is turned OFF, as stated above, due to the feedthrough of the gate parasitic capacitance of the analog switch 124, the output voltage of the operational amplifier 121 is slightly raised (see Fd after time td3 in (a) of FIG. 13).

Then, at time td4, the first capacitance detection period is shifted to the second capacitance detection period. Accordingly, in the first column line group, the PN code data from the inverting circuit 24 is changed from 1 to 0, and the drive pulse is dropped from the second voltage to the first voltage. Thus, the sensor devices (capacitance Cs) at the intersections between the column lines driven by the drive pulse and the row line are discharged due to the currents based on the voltages of the drive pulse, thereby allowing the output OUT of the operational amplifier 21 to gradually rise.

Conversely, although it is not shown in FIG. 13, in the second column line group, the PN code data from the inverting circuit 24 is changed from 0 to 1, and the drive pulse is raised from the first voltage to the second voltage. Thus, the sensor devices (capacitance Cs) at the intersections between the column lines driven by the drive pulse and the row line are charged due to the currents based on the voltages of the drive pulse, thereby allowing the output OUT of the operational amplifier 21 to gradually drop.

Then, at time td5, the timing control circuit 11 outputs an S/H signal to the sample-and-hold circuit 7. In response to the S/H signal, the sample-and-hold circuit 7 holds the measured voltage Vb output from the output OUT of the operational amplifier 121.

Then, at time td6 (td1 of time t2 of the subsequent cycle), the timing control circuit 11 outputs a reset signal to the charge amplifier circuit 6. This causes the output OUT and the inverting input terminal of the operational amplifier 121 to be short-circuited, and the feedback capacitor Cf is discharged, allowing the output OUT of the operational amplifier 121 to return to the reference potential.

In the above-described measurements, when the output OUT of the operational amplifier 121 rises or falls from the reference potential, the offset voltage Vk due to the feedthrough current of the analog switch 124 is generated in the + direction. As in this embodiment, when the capacitance Cs to be detected is several dozens to several hundred fF (femtofarads), the offsets caused by the feedthrough current cannot be ignored. In the above-described measurements, the resulting voltage proportional to the capacitance Cs is:

$-Va0=-Va+Vk.$

In this case, the voltage Va contains an error Vk due to the offset voltage.

$Va=Va0+Vk$

Accordingly, in this embodiment, the voltage Vb when the capacitance Cs is discharged is also measured. The voltage proportional to the capacitance Cs is:

$Vb0=Vb-Vk.$

In this case, the voltage Vb to be measured is:

$Vb=Vb0+Vk.$

The measured voltages Va and Vb are sequentially held in the sample-and-hold circuit 7. Then, each of the held voltages Va and Vb is converted into a digital voltage by the A/D converter 9, and the converted voltage is stored in the memory in the decoding computation circuit 10. Then, the decoding computation circuit 10 performs computation according to the following equation:

$d=Vb-Va=(Vb0+Vk)-(Va0+Vk)=Vb0-Va0.$

As a result, measured data without offset errors, i.e., measured data d corresponding to the multiplexed capacitance, can be obtained.

As described above, the decoding computation circuit 10 determines the difference between the output signals of the charge amplifier circuit 6 at the rise and at the fall of the potential of the column lines in response to the rise and the fall of the predetermined drive pulse in the drive pulse train. Accordingly, the decoding computation circuit 10 can measure the capacitance of the sensor devices (intersections) without being influenced by the feedthrough. Because of the provision of the selector circuit 8, the measurements of the capacitances of the individual column lines by the charge amplifier circuits 6 can be simultaneously performed for the individual column lines, thereby increasing the measurement speed of the overall sensor.

In the measurement period (measurement cycle) corresponding to time t2, the timing control circuit 11 outputs a clock to the code generator 1 in synchronization with the reset signal.

In response to this clock, the PN-code generating circuit 20 of the code generator 1 outputs one bit (data 1), and the storage shift register 23 shifts the bit data stored in the registers $23_1$ through $23_{14}$ to the registers $23_2$ through $23_{15}$, and inputs the one-bit data 1 into the register $23_1$.

In the storage shift register 23, therefore, since the data of the registers $23_{15}$ through $23_1$ are circulated by one bit, the bit string is shifted from {1, 1, 1, 0, 1, 0, 1, 1, 0, 0, 1, 0, 0, 0, 1} to {1, 1, 0, 1, 0, 1, 1, 0, 0, 1, 0, 0, 0, 1, 1}.

In response to the reset signal at time t2, the inverting control circuit 25 outputs a control signal for causing the inverting circuit 24 to invert the data output from the storage shift register 23 and output them.

Figure 11:
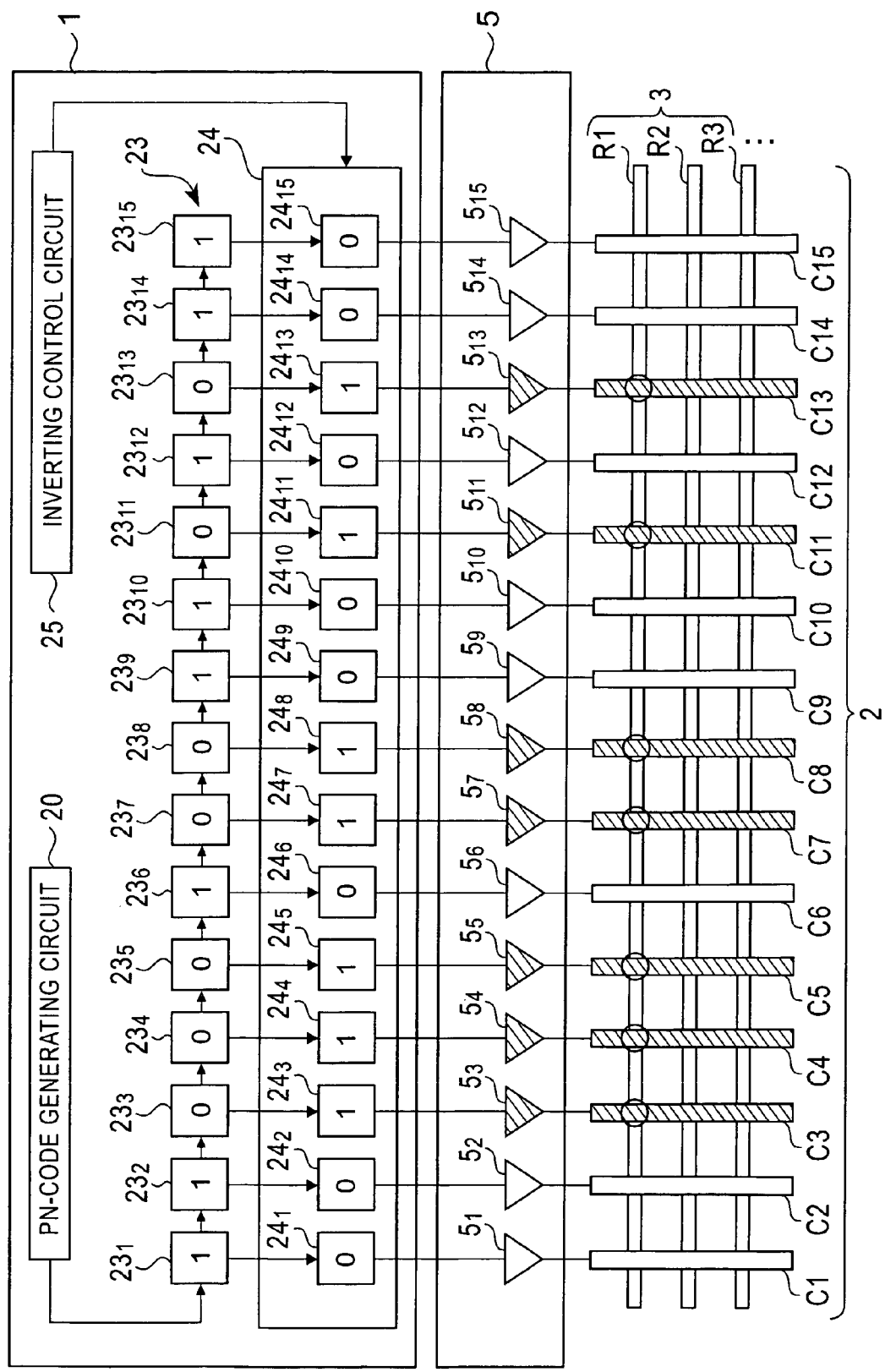
Figure 12:
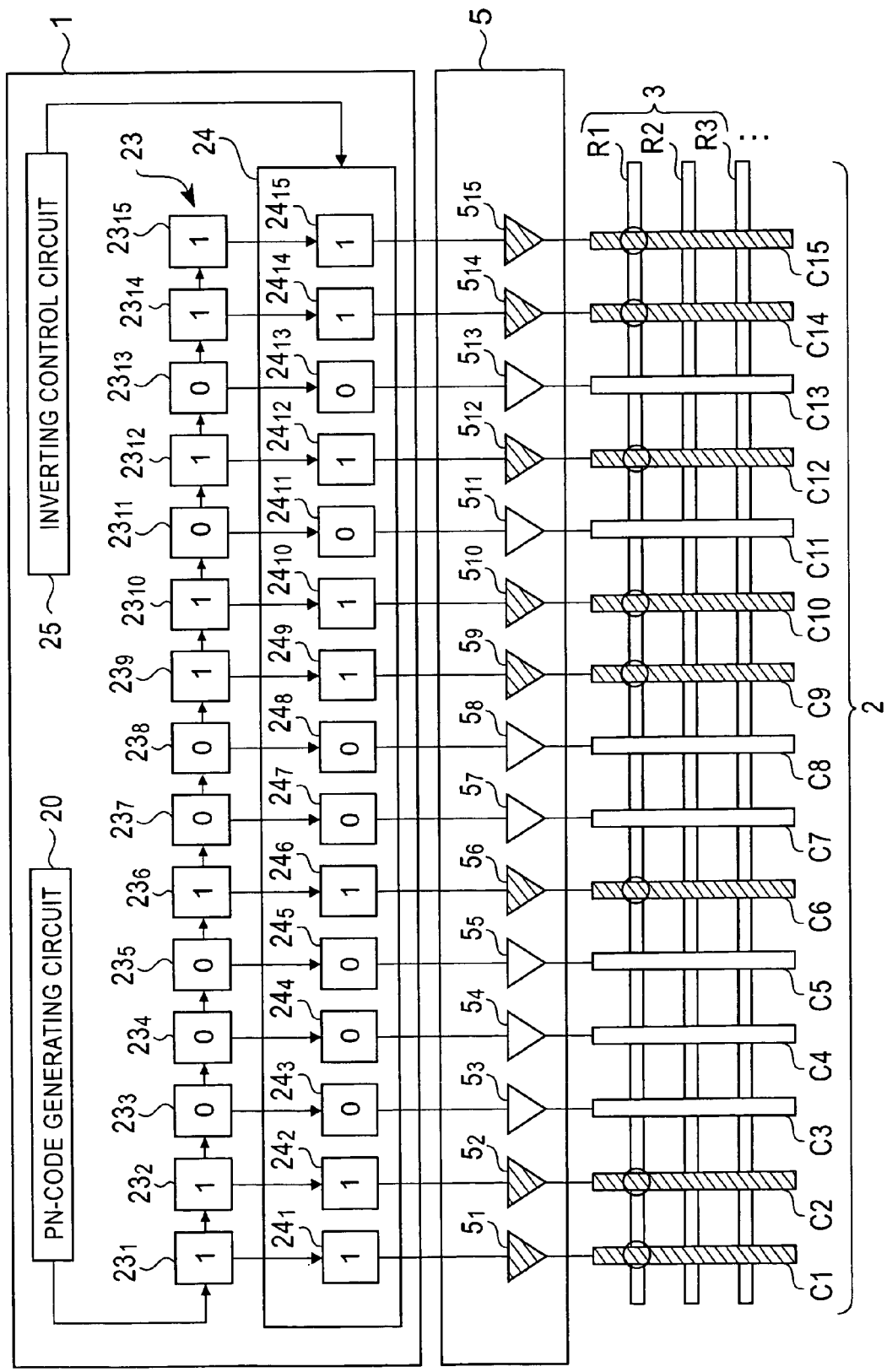
FIG. 12 illustrates an operation for driving column lines by using orthogonal code and multiplexing the capacitances of the sensor devices according to the first embodiment of the present invention.

Accordingly, the inverting circuit 24 inverts, as shown in FIG. 11, the data input from the registers $23_{15}$ through $23_1$ of the storage shift register 23 by using the inverting portions $24_{15}$ through $24_1$ so as to invert the bit string {1, 1, 0, 1, 0, 1, 1, 0, 0, 1, 0, 0, 0, 1, 1} to the bit string {0, 0, 1, 0, 1, 0, 0, 1, 1, 0, 1, 1, 1, 0, 0}, and outputs the inverted bit string to the driver circuits $5_{15}$ through $5_1$.

Then, the driver circuits $5_{15}$ through $5_1$ drive the corresponding column lines based on the bit string {0, 0, 1, 0, 1, 0, 0, 1, 1, 0, 1, 1, 1, 0, 0} input from the inverting portions $24_{15}$ through $24_1$.

Accordingly, in the column lines C1 through C15, the column lines C3, C4, C5, C7, C8, C11, and C13 are shifted as the second column line group to the second voltage (predetermined voltage at H level) in accordance with the bit data 1, while the column lines C1, C2, C6, C9, C10, C12, C14, and C15 are shifted as the first column line group to the first voltage (predetermined voltage at L level) in accordance with the bit data 0.

Referring back to FIG. 8, after the lapse of a predetermined period after the input of the reset signal at time t2, that is, when the first capacitance detection period is reached, the inverting control circuit 25 outputs a control signal for causing the inverting circuit 24 to output the data from the storage shift register 23 without inverting them.

Accordingly, in the first capacitance detection period, in response to this control signal, the inverting circuit 24 changes, as shown in FIG. 11, the bit string {0, 0, 1, 0, 1, 0, 0, 1, 1, 0, 1, 1, 1, 0, 0} stored in the inverting portions $24_{15}$ through $24_1$ to the bit string {1, 1, 0, 1, 0, 1, 1, 0, 0, 1, 0, 0, 0, 1, 1}.

In this case, the column line driver 5 drives the column line C1 to rise from the first voltage to the second voltage since the 15-bit data is changed from 0 to 1; the column line driver 5 drives the column line C2 to rise from the first voltage to the second voltage since the 14-bit data is changed from 0 to 1; the column line driver 5 drives the column line C3 to fall from the second voltage to the first voltage since the 13-bit data is changed from 1 to 0; and the column line driver 5 drives the other column lines C4 through C15 in accordance with changes in the data at the corresponding bit positions.

That is, the column line driver 5 drives the column lines C15, C14, C13, C12, C11, C10, C9, C8, C7, C6, C5, C4, C3, C2, and C1 by the driver circuits $5_{15}$, $5_{14}$, $5_{13}$, $5_{12}$, $5_{11}$, $5_{10}$, $5_9$, $5_8$, $5_7$, $5_6$, $5_5$, $5_4$, $5_3$, $5_2$, $5_1$, respectively, according to a drive pulse having a predetermined regular pulse width based on the clock signal output from the timing control circuit 11 (see (d) through (i) of FIG. 8 and (b) of FIG. 13).

Accordingly, in the first capacitance detection period, according to the predetermined drive pulses corresponding to the column lines, the column lines C1, C2, C6, C9, C10, C12, C14, and C15 are driven as the first column line group by the second voltage, while the column lines C3, C4, C5, C7, C8, C11, and C13 are driven as the second column line group by the first voltage.

Then, the total capacitance in the capacitor sensors at the intersections between the driven column lines and each of the row lines R1 through R15, i.e., the capacitances multiplied by the PN-code bit string, are connected to each of the corresponding row lines R1 through R15, respectively (FIG. 11).

Then, currents based on the charge transfer in the capacitances multiplied by the above-described column-line driving operation flow in the row lines, and the charge amplifier circuits 6 convert the currents into voltages and output them as measured voltages. Then, the sample-and-hold circuits 7 sample and hold the voltages in response to an S/H signal from the timing control circuit 11.

Then, after sampling the measured voltages corresponding to the multiplexed capacitances in the first capacitance detection period, the timing control circuit 11 outputs a reset signal to the charge amplifier circuits 6.

Referring back to FIG. 8, after the lapse of a predetermined period, that is, when the second capacitance detection period is reached after the first capacitance detection period, the inverting control circuit 25 outputs a control signal for causing the inverting circuit 24 to invert the data output from the storage shift register 23 and output them under the control of the timing control circuit 11.

The operation from td1 to td5 at time t1 and time t2 (for time t2, only in the first capacitance detection period) shown in FIG. 13 is repeated at each of time t3 to time t15 (the PN-code bit strings at the individual times stored in the storage shift register 23 are shown in FIG. 14). That is, in each cycle, the PN-code bit string is shifted, column lines are driven, and the measured voltage is obtained, thereby performing fingerprint taking.

In each of the first capacitance detection period and the second capacitance detection period, the capacitor detecting circuit 100 drives a plurality of column lines of the column line set 2 as the first column line group and the second column line group in response to a drive pulse based on the bit data of the PN code, and performs the above-described measurements every time the 15-bit PN code is shifted by one bit, thereby obtaining 15 measured voltages Vd, which are out of phase with each other by one bit, in chronological order for each row line. The measured voltages Vd are converted into the measured data Vn (n is the number of bits of the PN code) by the A/D converter 9. Thus, data strings {d1, d2, . . . , and d15}, which are multiplexed by the PN code, are obtained.

Figure 15:
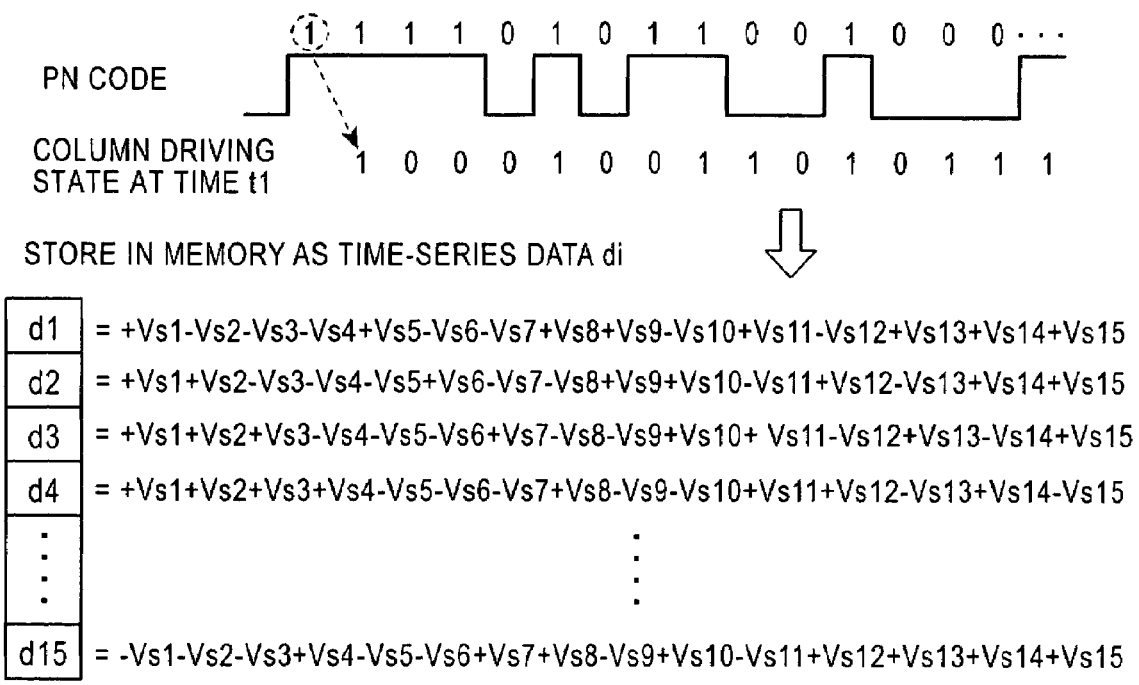
FIG. 15 schematically illustrates the relationship between the measured data di and the voltage data Vsj in the first embodiment.

The measured data, which are out of phase with each other by one bit for the individual row lines, as shown in FIG. 15, are stored in the memory in the decoding computation circuit 10.

In the equations in FIG. 15, Vs indicates the digital voltage data converted from the capacitance of the sensor device at the intersection of each of the driven column lines and the row line, and the measured data d is multiplexed capacitances of the sensor devices corresponding to the driven column lines based on the PN code.

The above-described equations can be modified into the following general expression:

$$d_i = \sum_{j=1}^{N} \begin{cases} PNs(i-j+1) \times Vs(j) & (i \geq j) \\ PNs(i-j+1+N) \times Vs(j) & (i < j) \end{cases} \quad (1)$$

wherein j (1, 2, 3, . . . , N) designates the number of column lines C, and i (1, 2, 3, . . . , N) represents the number of the measured data (corresponding to the phase-shift order).

In equation (1), since about half (8) the column lines of the column line set 2 are simultaneously driven based on the PN code, the added voltage data Vsj corresponding to the capacitances Csj of the sensor devices of about half the intersections is determined as the measured data di.

In equation (1), when the PN-code bit data PNi is 1, the polarity sign PNs(i(0072)) is +1, and when PNi is 0, the polarity sign PNs(i(0072)) is −1.

Then, the decoding computation circuit 10 determines the voltage data Vs of each sensor device from the multiplexed measured data and the PN code used for multiplexing the data according to the following equation.

$$ds_j = \sum_{i=1}^{N} \begin{cases} PNs(i-j+1) \times d(i) & (i \geq j) \\ PNs(i-j+1+N) \times d(i) & (i < j) \end{cases} \quad (2)$$

As stated above, the time-series measured data d determined by sequentially shifting the PN code by one bit can be separated into the voltage data ds corresponding to the capacitance of the sensor devices at the intersections between the driven column line and the row line, i.e., into voltage data Vs, by the product sum computation of the PN code and the measured data d according to equation (2).

In equation (2), it is assumed that, when the PN-code bit data PNi is 1, the polarity sign PNs(i(0074)) is +1, and when PNi is 0, the polarity sign PNs(i(0074)) is −1.

The decoding computation circuit 10 separates (decodes) the measured data d into the voltage data ds by using equation (2).

More specifically, the voltage data ds of the sensor devices, i.e., the voltage data {ds1, ds2, ds3, ds4, ds5, ds6, ds7, ds8, ds9, ds10, ds11, ds12, ds13, ds14, ds15} are multiplexed by the PN code for each row line, resulting in the data string of the measured data {d1, d2, d3, d4, d5, d6, d7, d8, d9, d10, d11, d12, d13, d14, d15}.

Accordingly, for the decoding operation, the data PNi of the PN-code bit string {1 (LSB), 1, 1, 1, 0, 1, 0, 1, 1, 0, 0, 1, 0, 0, 0 (MSB)} is multiplied as a coefficient with the measured data di.

When applying a drive signal to column lines based on predetermined PN code, the order of the bit string of the PN code corresponds to the order of the column lines. For example, the LSBs of the data at the individual times correspond to the column line C1, and the MSBs correspond to the column line C15.

Thus, the voltage data ds1 corresponding to the intersections with the column line C1 is determined by using the PN-code bit string {1 (LSB), 1, 1, 1, 0, 1, 0, 1, 1, 0, 0, 1, 0, 0, 0 (MSB)} in the following manner. The bit data PNi of this bit string is multiplied as a coefficient with the measured data di, and the resulting values are added over one cycle.

More specifically, the column line C1 is driven at time t1 according to the LSB of the PN-code bit string, and is driven at time t2 according to the second bit of the PN-code bit string, and finally, it is driven at time t15 according to the MSB of the bit string (see the table shown in FIG. 14). Accordingly, also in the product sum computation, the corresponding data of the PN code data are multiplied with the measured data at the corresponding times. Similarly, for the voltage data ds2 corresponding to the intersections with the column line C2, the PN-code bit string is shifted by one bit, resulting in {0 (LSB (time t1)), 1, 1, 1, 1, 0, 1, 0, 1, 1, 0, 0, 1, 0, 0 (MSB (time t15))} (corresponding to the second column in FIG. 14), and the data PNi of each bit of this bit string is multiplied as a coefficient with the measured data di, and the resulting values are added over one cycle.

The above-described processing corresponds to the product sum computation for PN code, and the voltage data dsj corresponding to each intersection can be determined by the product sum computation of the PN-code bit strings shifted by a predetermined number of bits. In this case, in the product sum computation during decoding, the initial PN code is used for the column line C1, and thereafter, the PN codes shifted one by one are used for the subsequent numbers of column lines.

That is, in the product sum computation during decoding, for the data measured at each time, the measured data at the intersections with the column line number to be determined is multiplied with the bit data of the same bit number (order) as the column line number of the bit string of the PN code used at the above-described time, and the resulting data are added. In other words, the same data as those of the bit data of the PN code used for driving the corresponding column lines at each time are used.

Figure 16:
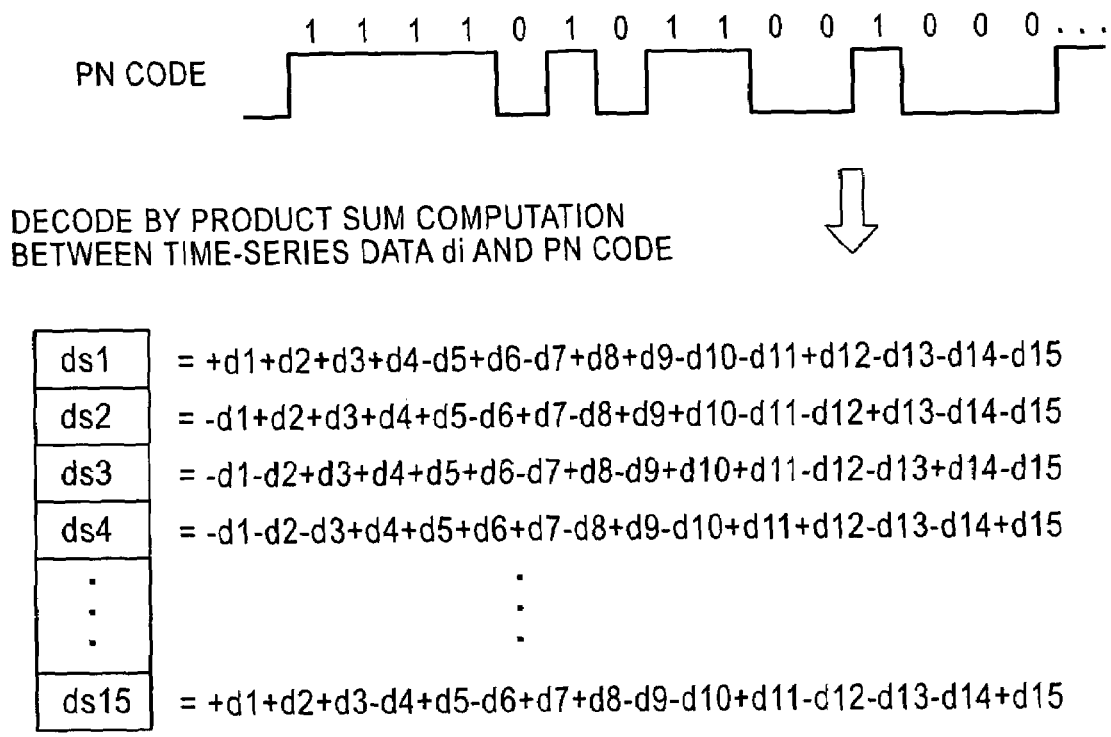
FIG. 16 schematically illustrates equations of the product sum computation by a decoding computation circuit to perform the decoding operation in the first embodiment.

In this embodiment, when the PN-code bit string corresponding to the 15 column lines is {1, 1, 1, 1, 0, 1, 0, 1, 1, 0, 0, 1, 0, 0, 0}, the decoding computation circuit 10 performs the product sum computation shown in FIG. 16 based on equation (2) so as to separate the voltage data dsj corresponding to the capacitances of the sensor devices from the data string of the measured data di.

As described above, in the first embodiment, a plurality of column lines are simultaneously driven based on the PN code, and in the subsequent cycle, the phase of the PN code is shifted. This operation is repeated. Meanwhile, the time-series data obtained by the detecting side is subjected to product sum computation with the PN code. Accordingly, the influences of the capacitances at the intersections with the other column lines can be substantially averaged, and also, only the information concerning electric charge charged and discharged in and from the sensor device (capacitor sensor) at the intersection with the target column lines can be extracted.

In the first embodiment, M-series PN code is used. Although there are other types of PN codes, M-series PN code has high autocorrelation. Thus, the influence of M-series PN code on the adjacent column lines when decoding the detected data becomes uniform, thereby most effectively reducing crosstalk between the column lines.

Figure 17:
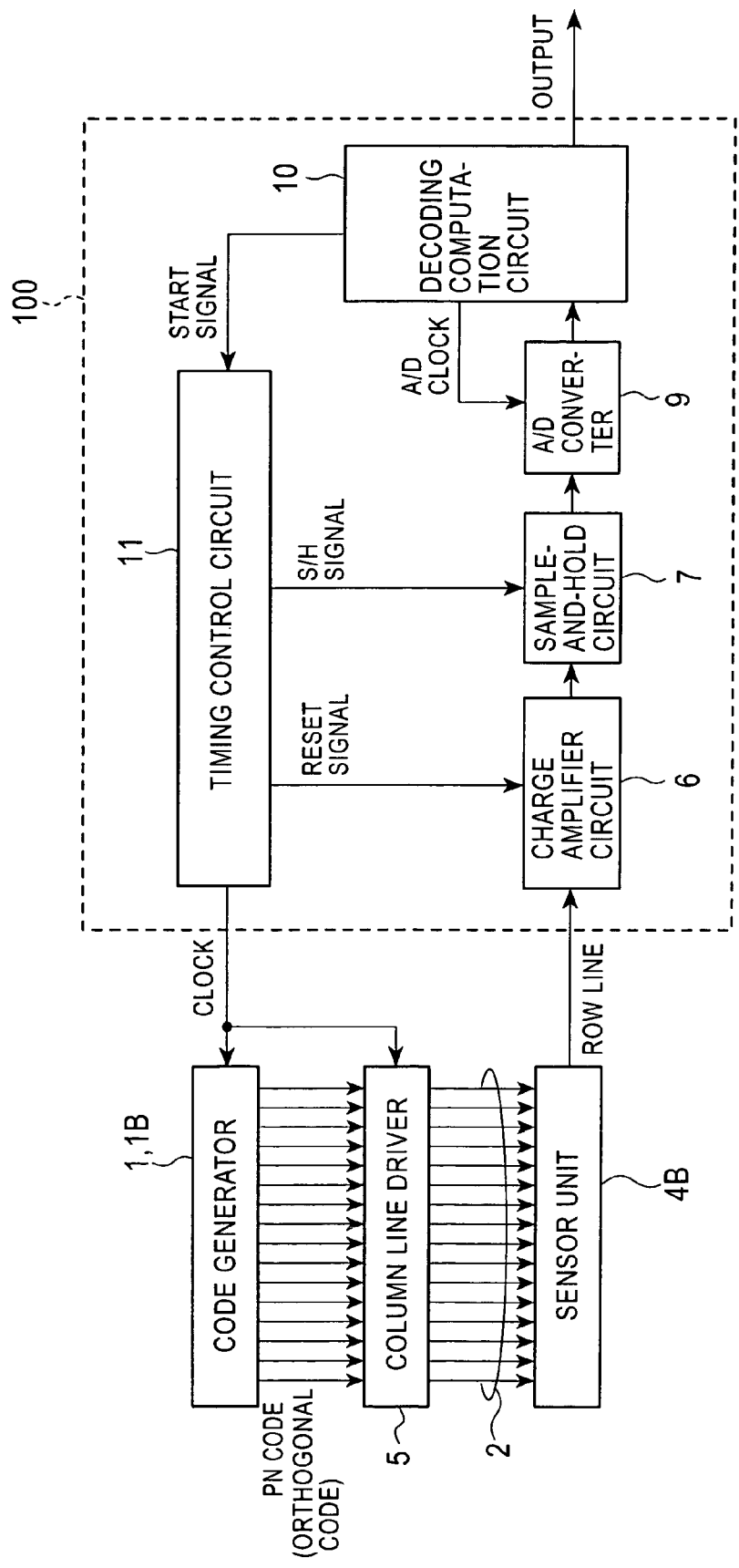
FIG. 17 is a block diagram illustrating the configuration when the capacitance detecting circuit in the first or second embodiment is used for a line sensor.

FIG. 17 is a block diagram illustrating the configuration of the capacitance detecting circuit of this embodiment used for a line sensor.

In this line sensor, row lines are combined into one row line.

The individual elements of the capacitance detecting circuit are similar to those of the above-described area sensor, except that the selector circuit 8 for selecting a row line to be detected is not provided, and an explanation thereof is thus omitted by designating the elements with like reference numerals.

The circuit of this line sensor is smaller that that of the area sensor, and thus, the power consumption and the cost can be reduced.

To use this line sensor as a fingerprint sensor, a finger is swept across the row line substantially at right angles. Then, the timing control circuit 11 outputs the corresponding signals for performing measurements in predetermined cycles, and the decoding computation circuit 10 splices the measured data of the individual row lines which are input in every cycle so as to detect two-dimensional fingerprint data.

Second Embodiment

A capacitance detecting circuit constructed in accordance with a second embodiment of the present invention is described below with reference to FIG. 1. Elements similar to those of the first embodiment are designated with like reference numerals, and an explanation thereof is thus omitted.

The capacitance detecting circuit of the second embodiment differs from that of the first embodiment in that the code generator 1 for generating PN code is substituted with a code generator 1B for generating orthogonal code.

The code generator 1B generates orthogonal code used for generating a control signal for selecting the row lines of the row line set 3 of the sensor unit 4. As the orthogonal code, orthogonal code having high orthogonality, for example, Walsh code, is used.

That is, as in the code generator 1, the code generator 1B divides the column line set 2 into two column line groups, i.e., the first column line group and the second column line group, based on the orthogonal code.

More specifically, in each of the first capacitance detection period and the second capacitance detection period, the column line driver 5 sequentially drives the first column line group and the second column line group complementarily based on the orthogonal code input from the code generator 1B in chronological order.

The column line driver 5 assigns the column lines of the column line set 2 to the first column line group when the bit data of the orthogonal-code bit string is 1, and allocates the column lines to the second column line group when the orthogonal-code bit data is 0. That is, the currents flowing in the capacitors in these column lines and the row line are synthesized (multiplexed).

The operations of the timing control circuit 11, the column line driver 5, the charge amplifier circuit 6, the sample-and-hold circuit 7, and the selector circuit 8 are similar to those of the first embodiment, and an explanation thereof is thus omitted.

An example of the operation of the capacitance detecting circuit 100 constructed in accordance with the second embodiment of the present invention is described below with reference to FIG. 1. The operation of the second embodiment is similar to that of the first embodiment, except that orthogonal code is used for multiplexing measured data instead of the PN code in the first embodiment. For the sake of simplicity, only the operation different from that of the first embodiment is discussed, assuming that 15-bit-length orthogonal code generated by an orthogonal code reading circuit 220 disposed in the code generator 1B shown in FIG. 18, which is described below, is used.

A signal indicating the start of the detection of the capacitance, that is, a signal indicating the start of fingerprint taking in the fingerprint sensor (sensor unit 4), is input into the decoding computation circuit 10.

Figure 22:
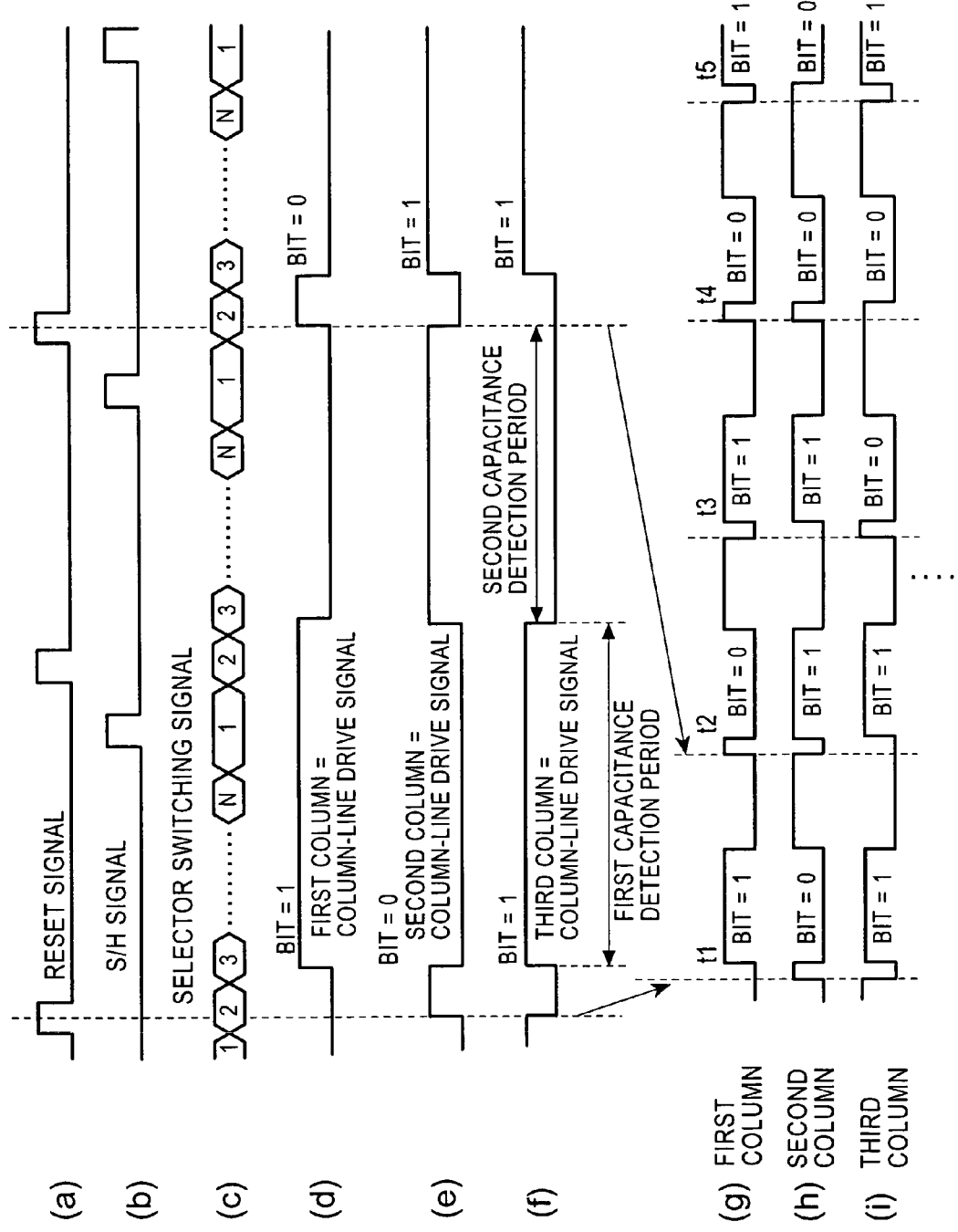
FIG. 22 is a timing chart illustrating the operation for controlling a selector circuit and the column lines according to the second embodiment of the present invention.

In response to this signal, the decoding computation circuit 10 outputs a start signal instructing the timing control circuit 11 to start detection to the timing control circuit 11. In response to the start signal, the timing control circuit 11 outputs, as shown in FIG. 22, a clock signal and a reset signal to the code generator 1B. The timing chart of FIG. 22 is different from that of FIG. 8 merely in the voltage level of a drive pulse applied to each column line since the orthogonal code shown in FIG. 20 is used rather than the PN code shown in FIG. 6, and other operations of the second embodiment are similar to those of the first embodiment.

Figure 18:
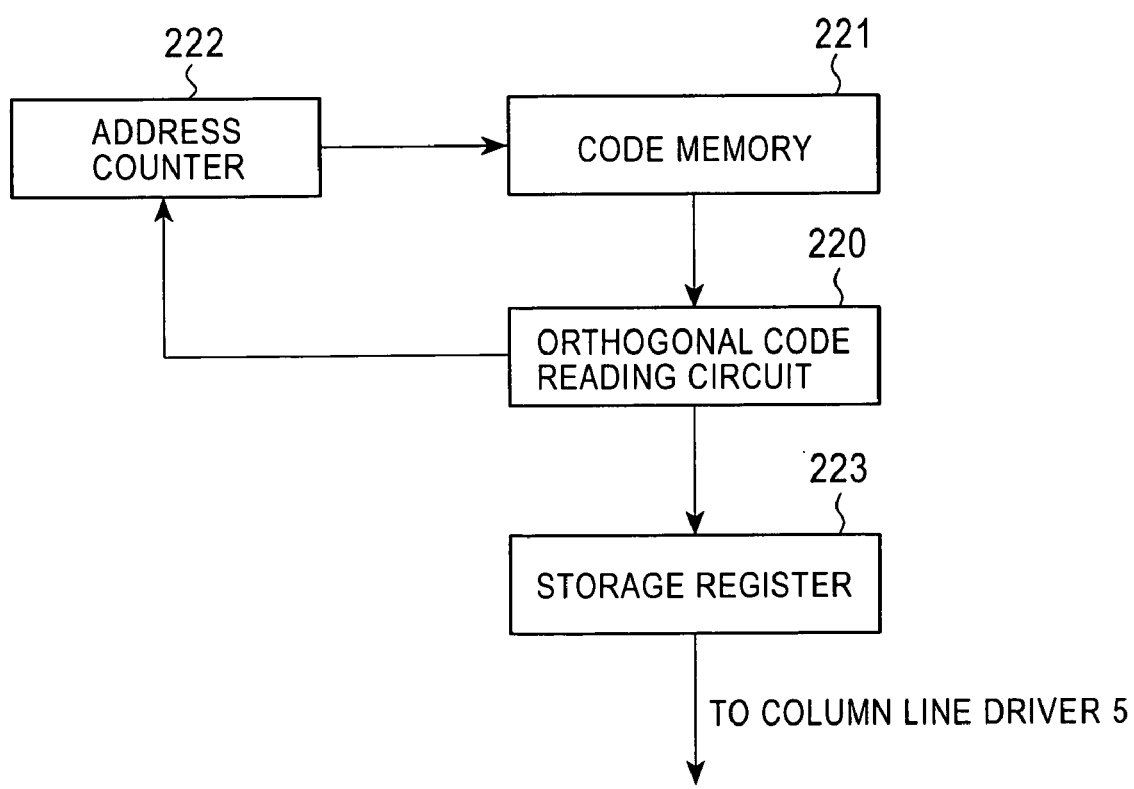
FIG. 18 is a block diagram illustrating the configuration of a code generator 1B shown in FIG. 1.

In response to the reset signal, the code generator 1B initializes the registers, i.e., an address counter 222 and the orthogonal code reading circuit 220 of the code generator 1B shown in FIG. 18, via the orthogonal code reading circuit 220, and sequentially reads and outputs the orthogonal codes from a code memory 221 to the registers 223, through $223_{15}$ of a storage register 223 in synchronization with the clock. Then, the storage register 223 outputs the orthogonal code to the corresponding column lines. The LSB of the orthogonal-code bit string is stored in the register $223_1$, higher positions of the bits are sequentially stored in the registers $223_2$ through $223_{14}$, and finally, the MSB of the orthogonal code is stored in the register $223_{15}$.

Figure 23:
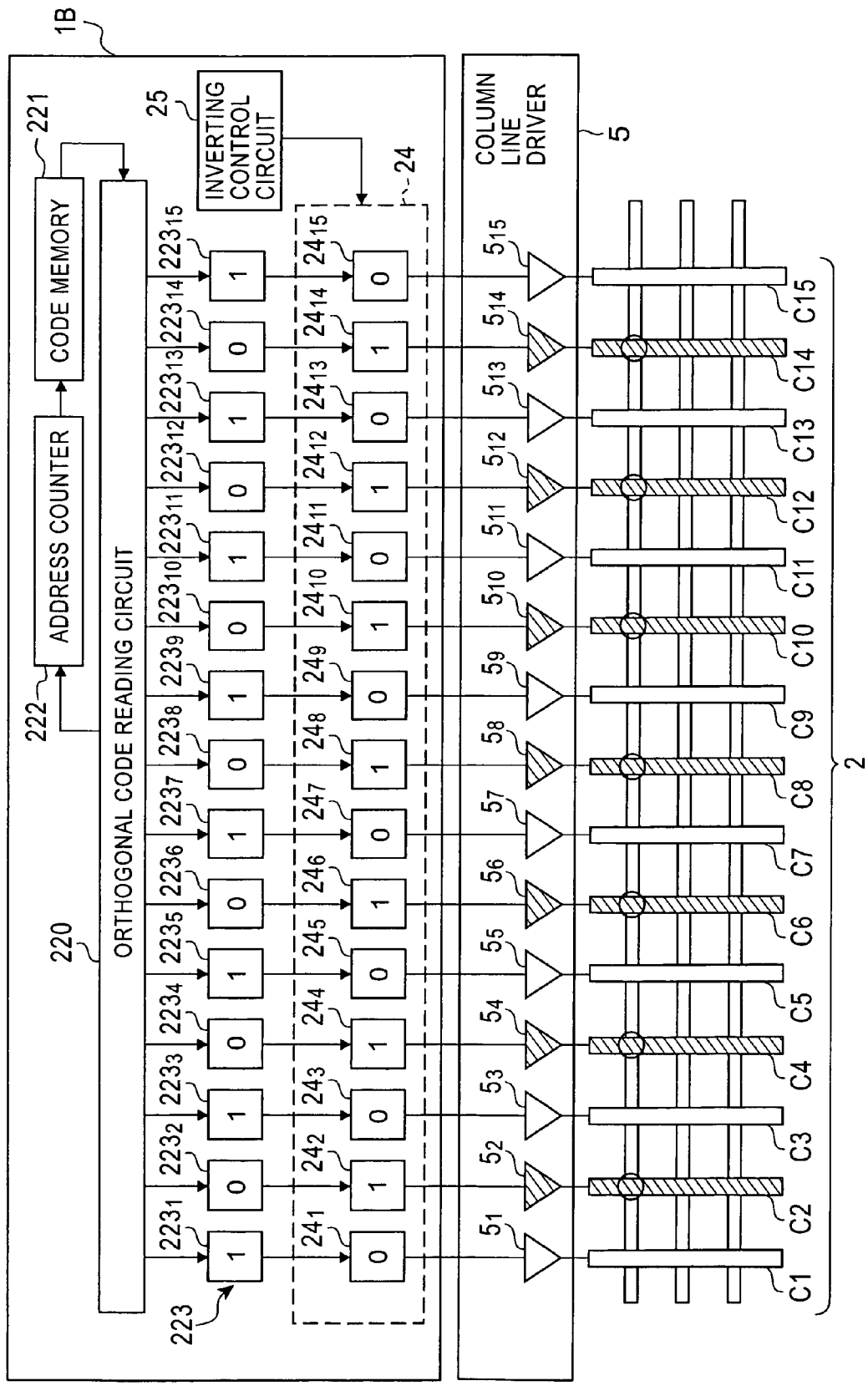
FIGS. 23 and 24 illustrate operations for driving column lines by using orthogonal code and multiplexing the capacitances of the sensor devices according to the second embodiment of the present invention.

For example, at time t1, the bit string {1 (LSB), 0, 1, 0, 1, 0, 1, 0, 1, 0, 1, 0, 1, 0, 1 (MSB)} of the orthogonal code at address t1 indicated in the table of FIG. 20 is written into the registers $223_1$ through $223_{15}$ of the storage register 223, as shown in FIG. 23.

The registers $223_1$ through $223_{15}$ are connected to the column lines C1 through C15, respectively, of the column line set 2 via the inserting circuit 24.

As in the first embodiment, the inverting circuit 24 outputs the data stored in the storage register 223 in the inverting state or non-inverting state to the column line driver 5 in response to a control signal from the inverting control circuit 25. The registers $223_1$ through $223_{15}$ are connected to the buffers $5_1$ through $5_{15}$, respectively, via the inverting portions $24_1$ through $24_{15}$, respectively.

In the code generator 1B, the generated orthogonal codes are stored in the built-in code memory 221, and every time the clock is input, an orthogonal data string is output to the column line driver 5.

Figure 19:
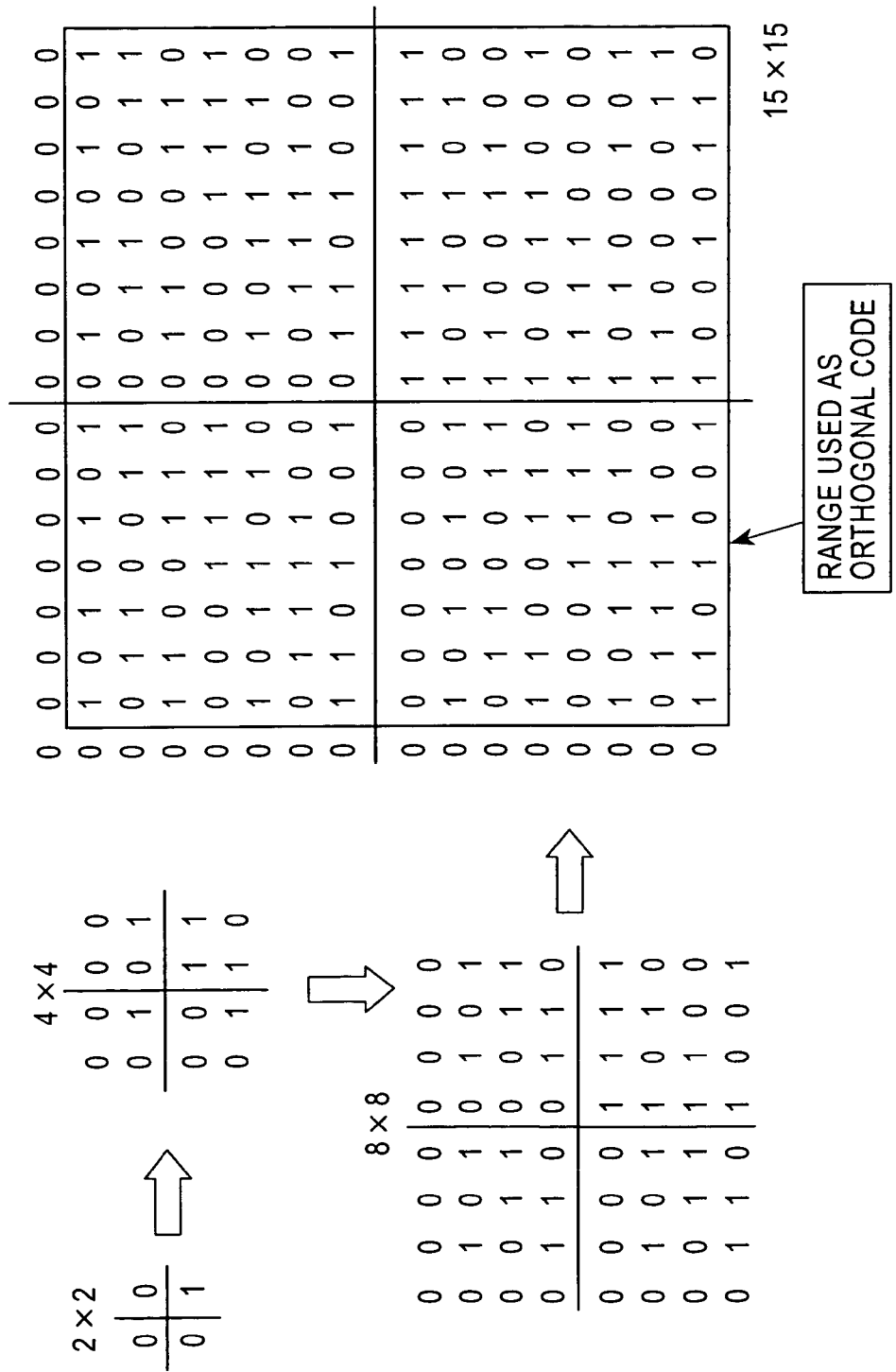
FIG. 19 schematically illustrates a process for generating Walsh code, which is typical orthogonal code.
Figure 21:
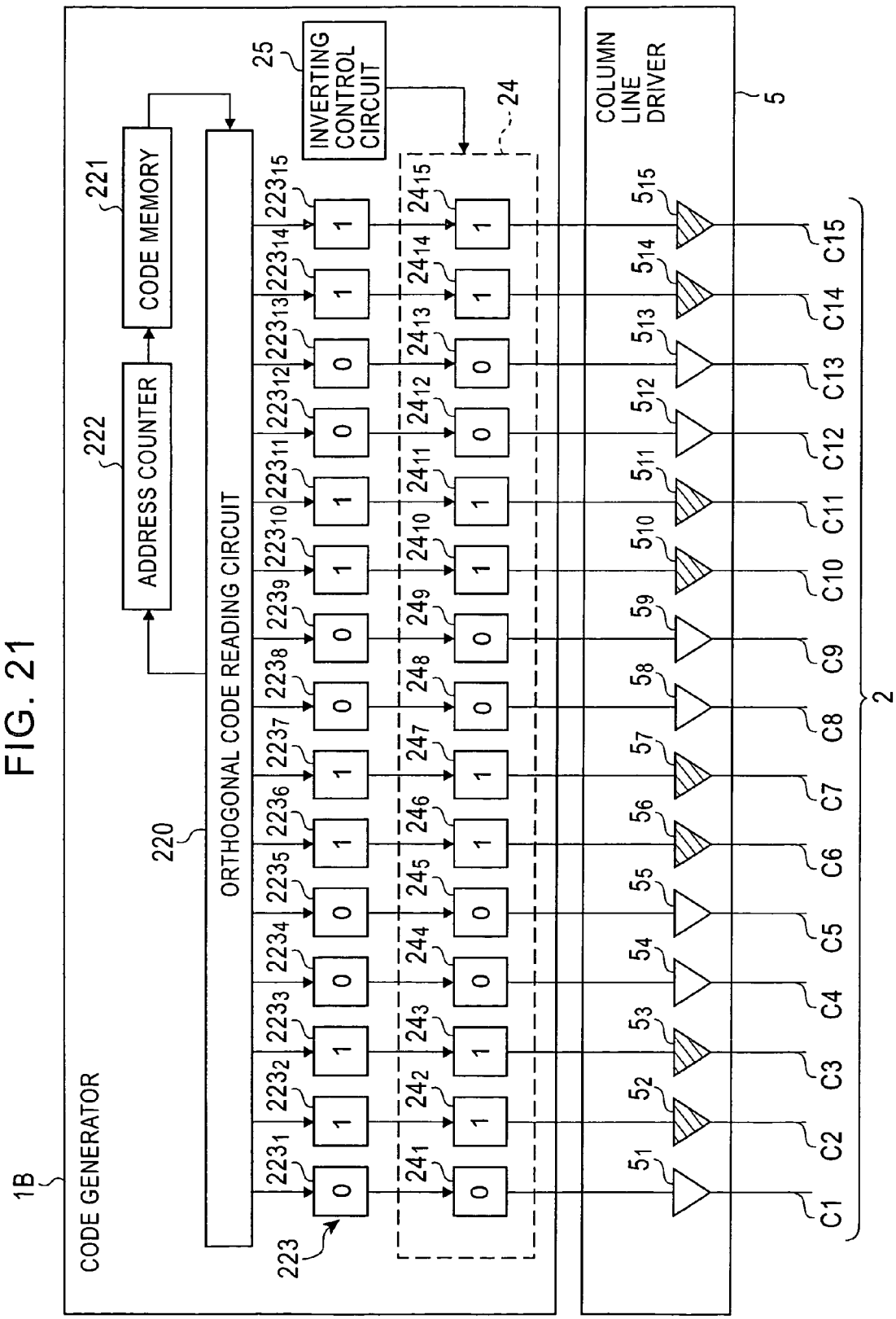
FIG. 21 schematically illustrates the relationship between the configuration of the code generator 1B and a column line driver shown in FIG. 1 according to a second embodiment of the present invention.

Walsh code, which is the typical orthogonal code, is generated in the order shown in FIG. 19. As the basic structure, a 2×2-basic unit is formed in such a manner that the bits at the top right, top left, and bottom left are the same, and the bits at the bottom right are inverted from the bits thereof.

Then, four of the 2×2-basic units are combined to form a 4×4-bit matrix. In this case, as in the 2×2-basic unit, the bits at the top right, top left, and bottom left are the same, and the bits at the bottom right are inverted. Similarly, an 8×8-bit matrix, a 16×16-bit matrix, and so on, are formed. In this manner, the number of bits in the matrix can be expanded into the number of bits (corresponding to the number of columns) in the bit string and the number of codes (corresponding to the number of rows).

In the second embodiment, the first row and the first column in which all the logical bit data are 0 are excluded from the code since the first row and column lines cannot be driven and measured data cannot be multiplexed. That is, in the example of FIG. 19, a 15×15-bit matrix is set to be the orthogonal code.

As discussed above, Walsh code can be generated even for long-length code, and the Walsh code generated as described above is used for multiplexing the capacitances in the following manner.

In this embodiment, the column line set 2 is formed of, for example, 15 column lines C1 through C15, and the 15×15-bit matrix orthogonal code is used for multiplexing the capacitances.

In the code memory (code memory 221 shown in FIG. 18) in the code generator 1B, the orthogonal data represented by the above-described 15×15-bit matrix is stored in the data format indicated by the table shown in FIG. 20. The individual row lines correspond to addresses t1 through t15 and the corresponding data are sequentially stored.

The Walsh code at address t1 is {1 (LSB) 0, 1, 0, 1, 0, 1, 0, 1, 0, 1, 0, 1, 0, 1 (MSB)}, and the Walsh code at address t15 is {1 (LSB) 1, 0, 1, 0, 0, 1, 1, 0, 0, 1, 0, 1, 1, 0 (MSB)}.

In response to a start signal, the timing control circuit 11 outputs a measurement start signal to the code generator 1B.

In response to the measurement start signal, the orthogonal code reading circuit 220 resets, as shown in FIG. 22, the address counter 222 and the storage register 223, and sets the count number of the address counter 222 to be 0.

At time t1, in response to the reset signal, the inverting control circuit 25 outputs a control signal for causing the inverting circuit 24 to invert the data output from the storage shift register 223 and output them under the control of the timing control circuit 11.

In this case, based on the orthogonal code at address t1, the first column line group is formed of the column lines C1, C3, C5, C7, C9, C11, C13, and C15, while the second column line group is formed of the column lines C2, C4, C6, C8, C10, C12, and C14.

Accordingly, the inverting circuit 24 inverts, as shown in FIG. 23, the bit string {1 (LSB) 0, 1, 0, 1, 0, 1, 0, 1, 0, 1, 0, 1, 0, 1 (MSB)} into the bit string {0 (LSB) 1, 0, 1, 0, 1, 0, 1, 0, 1, 0, 1, 0, 1, 0 (MSB)}, and outputs it to the column line driver 5.

Then, after the lapse of a predetermined period after the input of the reset signal at time t1, i.e., when the first capacitance detection period is reached, the inverting control circuit 25 outputs a control signal for causing the inverting circuit 24 to output the data from the storage register 223 without inverting them to the inverting circuit 24.

Figure 24:
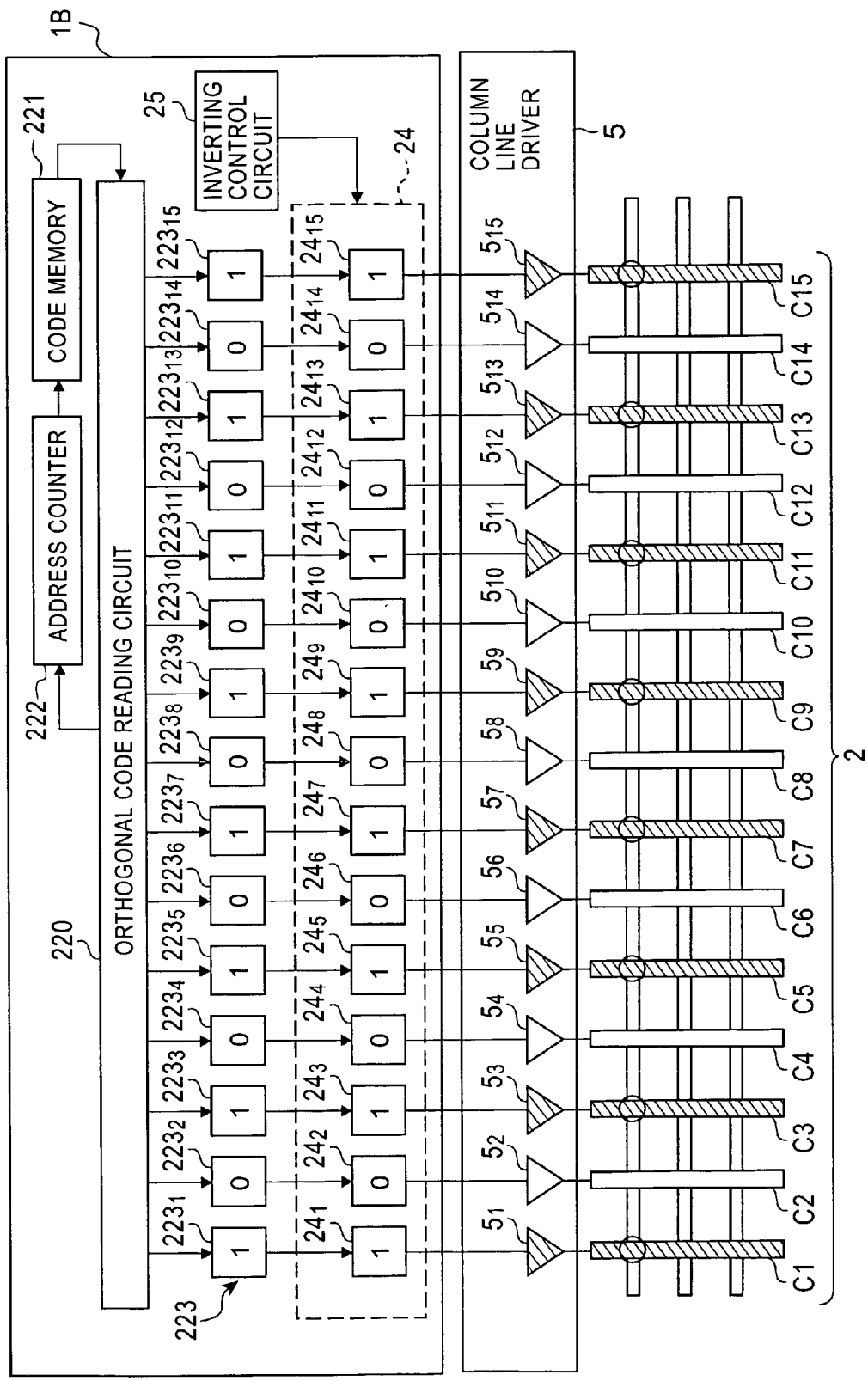

Accordingly, the inverting circuit 24 outputs, as shown in FIG. 24, the bit string {1 (LSB) 0, 1, 0, 1, 0, 1, 0, 1, 0, 1, 0, 1, 0, 1 (MSB)} to the column line driver 5 without inverting it.

Every time a current cycle is shifted to the subsequent cycle after the first and second capacitance detection periods, to measure the capacitances at the intersections, the orthogonal code reading circuit 220 receives the clock from the timing control circuit 11 and outputs the count signal to the address counter 222.

Then, the address counter 222 counts the input count signal, and outputs the corresponding addresses t1, t2, . . . , t15 to the code memory 221.

Then, the code memory 221 outputs the Walsh code data (row-line bit string) corresponding to the input addresses t1 through t15 to the orthogonal code reading circuit 220.

The orthogonal code reading circuit 220 associates the read orthogonal code with the order of the above-described bit string from the LSB to the MSB, and writes it into the storage register 223.

If, for example, the orthogonal code at address t1 in the table shown in FIG. 20 is written into the storage register 223, the bit data of the bit string {1 (LSB) 0, 1, 0, 1, 0, 1, 0, 1, 0, 1, 0, 1, 0, 1 (MSB)} is input into the registers $223_1$ through $223_{15}$.

Then, the column line driver 5 complementarily drives the column lines of the column line set 2 as the two column line groups, i.e., the first column line group and the second column line group according to the bit data of the input orthogonal-code bit string. The driving operation for the column lines according to the bit data is similar to that of the first embodiment, and a detailed explanation thereof is thus omitted.

In a manner similar to the capacitance detection processing discussed in the first embodiment, at each of the times t1 to t15, the processing from td1 to td5 shown in FIG. 13 is repeated (the order of orthogonal-code bit strings stored in the storage register 23 at the individual times are indicated in the table in FIG. 20). Then, the orthogonal code is read from the code memory 221, the column lines are driven, and the measured voltage is obtained; such an operation is repeated over one cycle of the memory addresses t1 to t15, thereby obtaining a fingerprint.

Then, in the capacitor detecting circuit 100, in response to the drive pulse P at each time, the code generator 1B sequentially reads from the code memory 221 15-bit orthogonal code obtained as a result of the above-described measurement processing, and stores them in the registers of the storage register 223.

Then, the code generator 1B outputs the bit data of the orthogonal code in the non-inverting state during the first capacitance detection period, and outputs the bit data in the inverting state in the second capacitance detection period.

The column line driver 5 then drives the column lines as the first column line group and the second column line group according to the bit data input from the storage register 223 via the inverting circuit 24.

Accordingly, in the capacitor detecting circuit 100, the 15 measured voltages Vd at each of the addresses t1 to t15 corresponding to the individual times are obtained for each row line in chronological order. The measured voltages Vd are converted into the measured data d by the A/D converter 9, resulting in the data string {d1, d2, . . . , d15} of the measured data multiplexed by the orthogonal code.

As the measured data having 15 measured voltages (measured by using the orthogonal codes in the table shown in FIG. 20), the following data strings are stored in the memory in the decoding computation circuit 10 as the data shown in FIG. 25.

In the data shown in FIG. 25, Vs indicates the digital voltage data converted from the capacitance of the sensor device at the intersection of each of the driven column lines and the corresponding row line, and the measured data d is multiplexed capacitances of the sensor devices corresponding to the driven column lines based on the orthogonal code.

The above-described equations can be modified into the following general expression:

$$d_i = \sum_{j=1}^{N} CDs(i, j) \times Vs(j) \quad (3)$$

wherein j (1, 2, 3, . . . , N) designates the number of column line C, and i (1, 2, 3, . . . , N) represents the number of the measured data (corresponding to the order of the address ti). That is, CD(i,j) in equation (3) indicates the polarity sign of the j-th element of the i-th address at time ti.

In the above equation, when the orthogonal-code bit data CD(i,j) is 1, the polarity sign CDs(i,j) is +1, and when CD(i,j) is 0, the polarity sign CDs(i,j) is −1. Based on the orthogonal code, about one half (8) the column lines are set to be the first column line group and about the other half (7) the column lines are set to be the second column line group. The voltage data Vsj obtained by multiplying the capacitances Csj of the sensor devices at about half the intersections are added, resulting in the measured data di.

Then, the decoding computation circuit 10 determines the voltage data Vs of each sensor device from the multiplexed measured data and the orthogonal code used for multiplexing the data according to equation (4).

$$ds_j = \sum_{i=1}^{N} CDs(i, j) \times d(i) \quad (4)$$

As stated above, the time-series measured data d determined by sequentially reading the orthogonal code from the code memory 221 can be separated into the voltage data ds corresponding to the capacitances of the sensor devices at the intersections between the column lines complementarily driven with the row line, i.e., into voltage data Vs, by the product sum computation of the orthogonal code and the measured data d according to equation (4).

In equation (4), it is assumed that, when the orthogonal-code bit data CD(i,j) is 1, the polarity sign CDs(i,j) is +1, and when CD(i,j) is 0, the polarity sign CDs(i,j) is −1.

The decoding computation circuit 10 separates the measured data di into the voltage data dsj by using equation (4).

More specifically, the voltage data dsj of the sensor devices, i.e., the voltage data {ds1, ds2, ds3, ds4, ds5, ds6, ds7, ds8, ds9, ds10, ds11, ds12, ds13, ds14, ds15}, are multiplexed by the orthogonal code for each row line, resulting in the data string of the measured data {d1, d2, d3, d4, d5, d6, d7, d8, d9, d10, d11, d12, d13, d14, d15}.

Accordingly, for the decoding operation, each measured data di is multiplied with the polarity sign CDs(i,j) corresponding to the data CD(i,j) of each bit of the orthogonal-code bit string {1 (LSB), 0, 1, 0, 1, 0, 1, 0, 1, 0, 1, 0, 1, 0, 1 (MSB)}.

The order of the bit string corresponds to the order of the column lines; for example, the LSBs correspond to the column line C1, and the MSBs correspond to the column line C15.

Thus, the voltage data ds1 corresponding to the intersections with the column line C1 is determined by using the LSBs of the orthogonal-code bit string at addresses t1 to t15 {1(t1), 0(t2), 1(t3), 0(t4), 1(t5), 0(t6), 1(t7), 0(t8), 1(t9), 0(t10), 1(t11), 0(t12), 1(t13), 0(t14), 1(t15)} in the following manner. The polarity sign CDs(i,j) corresponding to bit data CD(i,j) of this bit string is multiplied with each measured data di, and the resulting values are added over one cycle.

More specifically, the voltage data ds1 at the intersections with the column line C1 has been obtained in the following manner. The column line C1 is classified into the first or second column line group by the bit data of the LSB (first bit) of the orthogonal code at address t1 at time t1, and is classified into the first or second column line group by the LSB of the orthogonal code at address t2 at time t2, and similarly, it is classified into the first or second column line group by the LSB of the orthogonal code at address t15 at time t15. Accordingly, also in the product sum computation, each measured data di is multiplied with the polarity sign corresponding to the bit data of the orthogonal code used for multiplexing, and the resulting values are added.

Similarly, the voltage data ds2 at the intersections with the column line C2 has been obtained in the following manner. The column line C2 is classified into the first or second column line group by the bit data of the second bit of the orthogonal code at address t1 at time t1, and is classified into the first or second column line group by the second bit of the orthogonal code at address t2 at time t2, and similarly, it is classified into the first or second column line group by the second bit of the orthogonal code at address t15 at time t15. Accordingly, also in product sum computation, each measured data di is multiplied with the polarity sign corresponding to the bit data of the orthogonal code used for the multiplexing, and the resulting values are added.

That is, the voltage data ds2 corresponding to the intersections with the column line C2 is determined by using the second bits of the orthogonal-code bit string at addresses t1 to t15 {0(t1), 1(t2), 1(t3), 0(t4), 0(t5), 1(t6), 1(t7), 0(t8), 0(t9), 1(t10), 1(t11), 0(t12), 0(t13), 1(t14), 1(t15)} in the following manner. The polarity sign CDs(i,j) corresponding to bit data CD(i,j) of this bit string is multiplied with each measured data di, and the resulting values are added over one cycle.

As discussed above, the voltage corresponding to the capacitance at each intersection is obtained as follows. Each measured data di is multiplied with the polarity sign CDs(i,j) corresponding to the data CD(i,j) of the orthogonal-code bit string used for dividing the column line set 2 into the first column line group and the second column line group when the drive pulse P is applied at each of the times t1 to t15, and the resulting values are added over one cycle. This processing corresponds to product sum computation using orthogonal code. The voltage data dsj corresponding to each intersection is determined by the product sum computation of the measured data di and the polarity signs corresponding to the orthogonal-code bit string stored in the code memory 221.

That is, in the product sum computation during decoding, for the data measured at each time, the measured data at the intersections with the column line number to be determined is multiplied with the polarity sign corresponding to the bit data of the same bit number (order) as the column line number of the orthogonal-code bit string used at the above-described time, and the resulting data are added. In other words, the polarity signs of the same data as those of the bit data of the orthogonal code used for dividing the corresponding row line into the first or second column line group at each time are used.

In the orthogonal code stored in the code memory 221, as shown in FIG. 20, corresponding to the 15 column lines, the decoding computation circuit 10 performs the computation shown in FIG. 26 based on equation (4) according to the orders of the orthogonal-code bit strings at the addresses t1 to t15 so as to separate the voltage data dsj corresponding to the capacitances in the sensor devices from the data string of the measured data di.

As described above, in the second embodiment, the column lines of the column line set 2 are classified into the first column line group and the second column line group based on the bit data of the orthogonal code, and the synthesized measured voltage is output, and in the subsequent timing, the orthogonal code at the address at the corresponding time is read from the code memory 221, and the above-described measurements are performed. This operation is repeated. Meanwhile, the time-series data obtained by the detecting side is subjected to product sum computation with the orthogonal code. Accordingly, the influences of the capacitances at the intersections with the other column lines can be substantially averaged, and also, only the information concerning electric charge charged and discharged in and from the sensor devices (capacitor sensors) at the intersection with the target column lines can be extracted.

Third Embodiment

A capacitance detecting circuit constructed in accordance with a third embodiment of the present invention is described below with reference to FIG. 27. Elements corresponding to those of the first and second embodiments are designated with like reference numerals, and an explanation thereof is thus omitted.

The third embodiment differs from the first and second embodiments in that the columns lines of the column line set 2 are divided into a plurality of column line groups, and the column line groups are sequentially selected one by one to perform multiplexing measurements, namely, while a selected column line group performs measurements, the other (unselected) column line groups do not perform measurements.

In other words, in the first and second embodiments, multiplexing by using the PN code or orthogonal code is performed on the overall column lines, while in the third embodiment, column lines are complementarily driven in each of the column line groups so as to multiplex the measured voltages by using PN code or orthogonal code.

Figure 27:
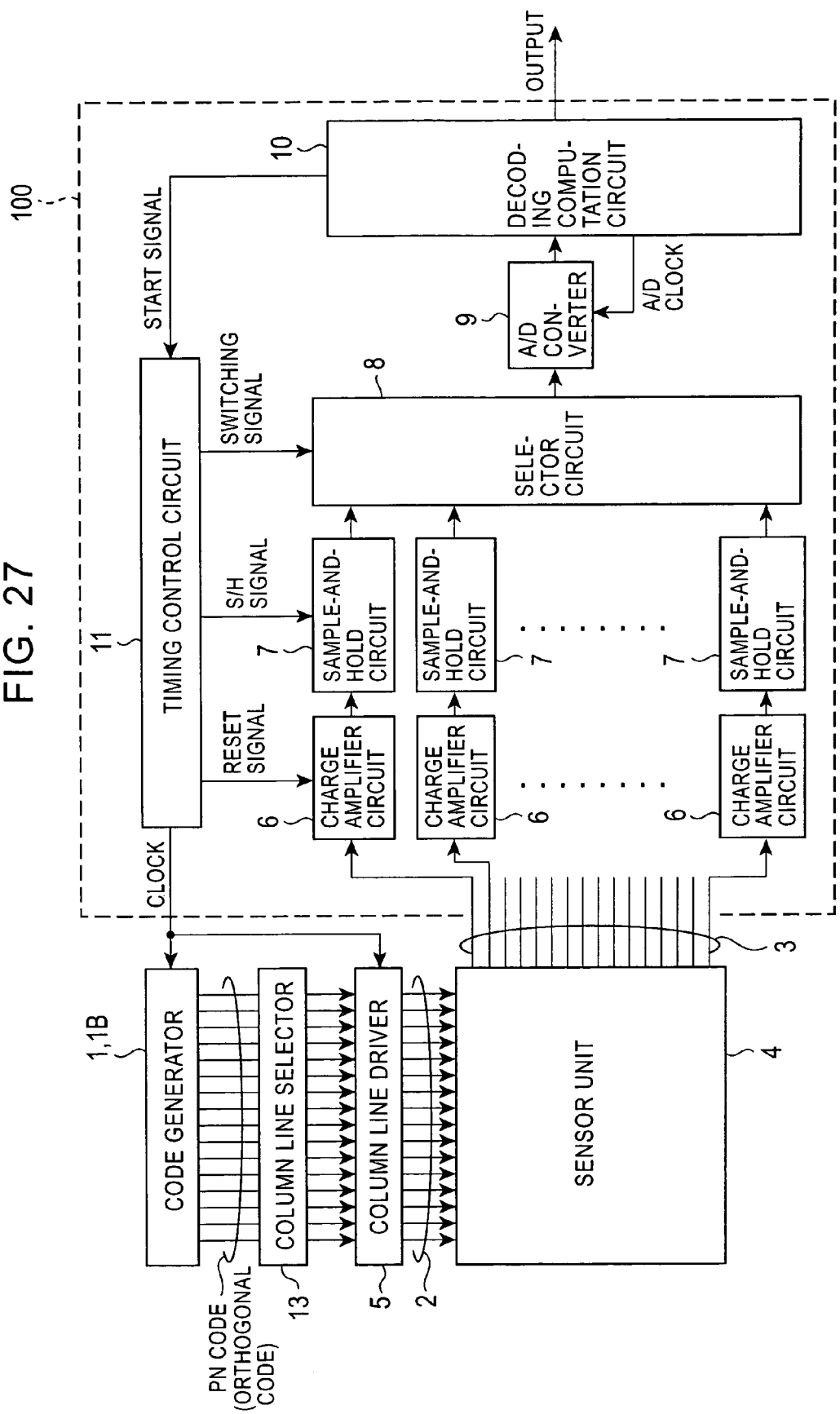
FIG. 27 is a block diagram illustrating the configuration of a capacitance detecting circuit according to a third embodiment of the present invention.

Accordingly, in the capacitor detecting circuit of the third embodiment, a column line selector 13 for dividing the column line set 2 into column line groups, each having a predetermined number of column lines, and for selecting the column line group to be measured is inserted, as shown in FIG. 27, between the code generator 1 (or 1B) and the column line driver 5.

The column line selector 13 divides a plurality of column line groups, each having a predetermined number of column lines, selects one of the column line groups, and outputs the PN code or orthogonal code from the code generator 1 (or 1B) to the column line driver 5.

The column line group selected by the column line selector 13 is input into the corresponding buffer circuit of the column line driver 5, and the column line driver 5 supplies a drive pulse generated from the PN code or orthogonal code to the selected column line group.

Figure 28:
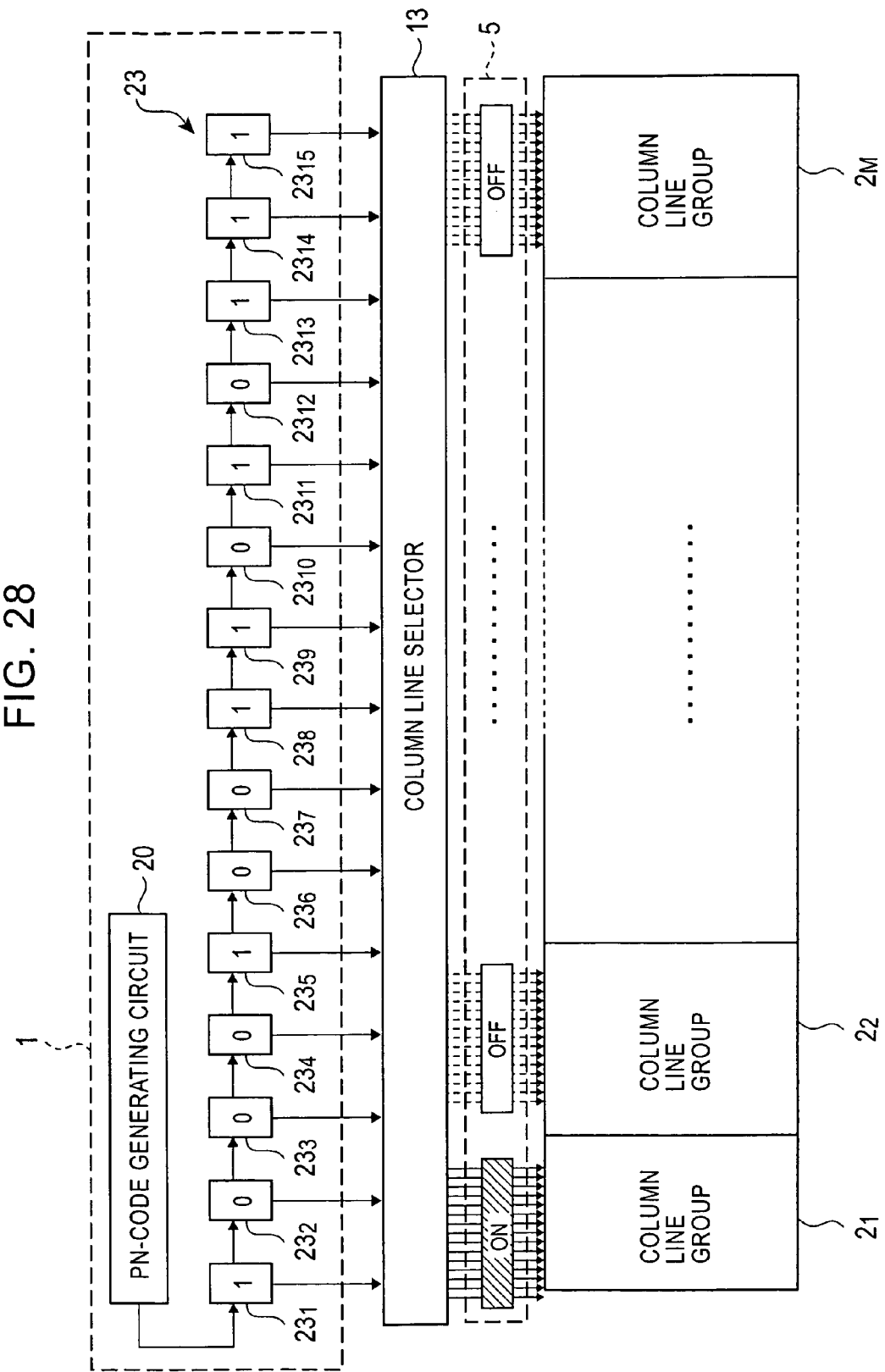
FIG. 28 schematically illustrates column line groups and a column line selector in the third embodiment.

FIG. 28 illustrates the configuration of the column line selector 13 for selecting the column line group to be driven from the column line set 2. Although the circuit configuration when the PN code is generated is shown in FIG. 28, the configuration of the column line selector 13 when orthogonal code is used is similar to that shown in FIG. 28.

The column line driver 5 divides, as shown in FIG. 28, the column line set 2 into a predetermined number, for example, M, column line groups $2_1$ through $2_M$, and sequentially outputs the data from the storage shift register 23 into the selected column line group at regular intervals.

The number of column lines in each column line group is the same as the number of bits of the bit string of the PN code or orthogonal code generated by the code generator 1 (or 1B).

In the third embodiment, if the number of bits of the PN code or the orthogonal code is 15, the number of column lines in each of the column line groups $2_1$ through $2_M$ is also 15.

In the third embodiment, adjacent, consecutive column lines are combined into a group, and if the number of bits of the PN code or orthogonal code is 15 (N=15), 15 column lines are combined into one column line group, resulting in the 17 column line groups (M=17). Accordingly, 255 column lines can be controlled.

Figure 29:
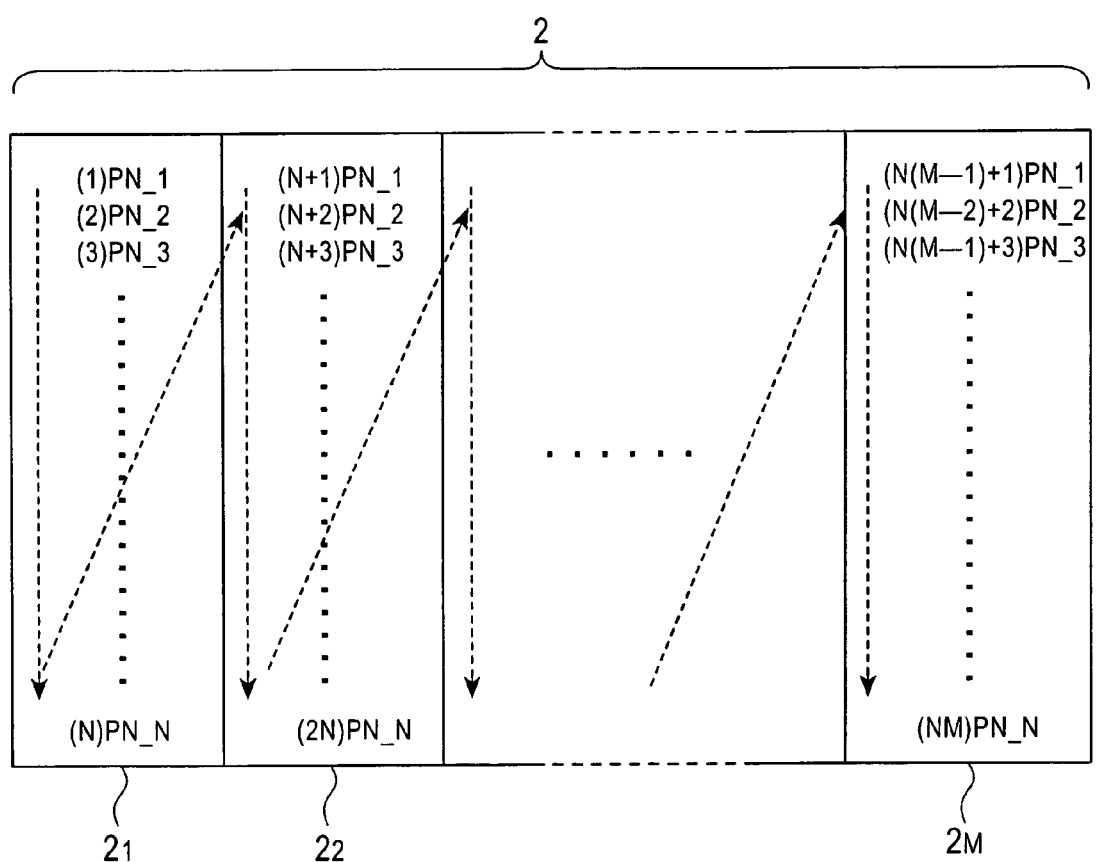
FIG. 29 schematically illustrates the measurement processing for each column line group in the third embodiment.

In the third embodiment, the column line selector 13 maintains, as shown in FIG. 29, the selected column line group during one cycle of the PN code or orthogonal code according to a control signal from the timing control circuit 11. That is, the column line group is switched in every cycle of PN code or orthogonal code.

That is, when the measurements of the capacitances at the intersections between the row lines and the column lines are finished over one cycle, another column line group is selected, as shown in FIG. 29. The column line groups may be selected in the ascending order from the column line groups $2_1$ to $2_M$, or the column line groups may be selected randomly.

The operation for measuring the capacitances in each column line group is similar to that of the first or second embodiment, and a detailed explanation thereof is thus omitted.

Fourth Embodiment

To further develop the third embodiment, in a fourth embodiment, in the capacitance measurement method for measuring capacitances for each column line group by dividing the column line set 2 into a plurality of column line groups, the measurement precision of the capacitance detecting circuit is improved.

In the third embodiment, information concerning basic DC components disappears due to the complementary control operation for driving the column lines, and due to the capacitance at the intersections between a row line and column lines other than the driven column lines, which is caused by crosstalk, offset components are generated in measured voltages to be multiplexed.

The capacitance of each row line and the unselected column lines varies depending on the column line group, and thus, the offset levels in the individual row lines are not stabilized. As a result, in a two-dimensional fingerprint image obtained by the measured data of the individual row lines, the shade of the image may become non-uniform depending on the row lines due to the different offset levels.

Accordingly, in the capacitance detecting circuit of the fourth embodiment, to suppress the non-uniform shade of a resulting image, the number of column lines in each column line group is differentiated from the number of bits of a bit string of the PN code or orthogonal code. That is, the number of column lines in a column line group is set to be smaller than the number of bits of the PN code or orthogonal code by at least one bit.

Figure 30:
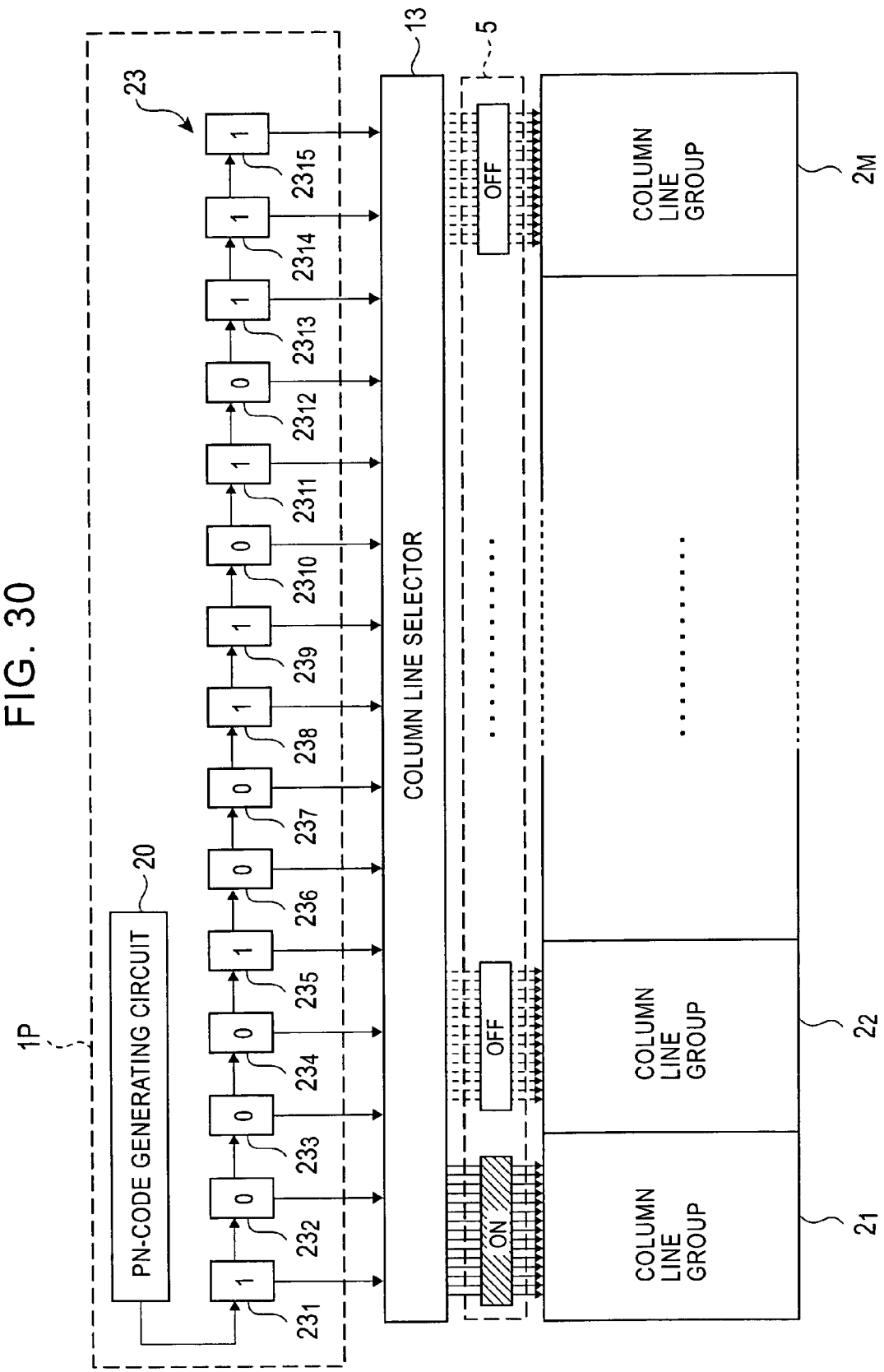
FIG. 30 schematically illustrates column line groups and a column line selector in a fourth embodiment.

For example, for the 15-bit PN code or orthogonal code, one bit is set to be unused (not connected), as shown in FIG. 30, and 14 column lines are connected to the 15-bit PN code or orthogonal code.

Accordingly, in the bit string of the PN code or orthogonal code, one bit is associated with an imaginary column line, and this imaginary column line is not activated, and can be used as a reference value of the constant capacitance.

Figure 31:
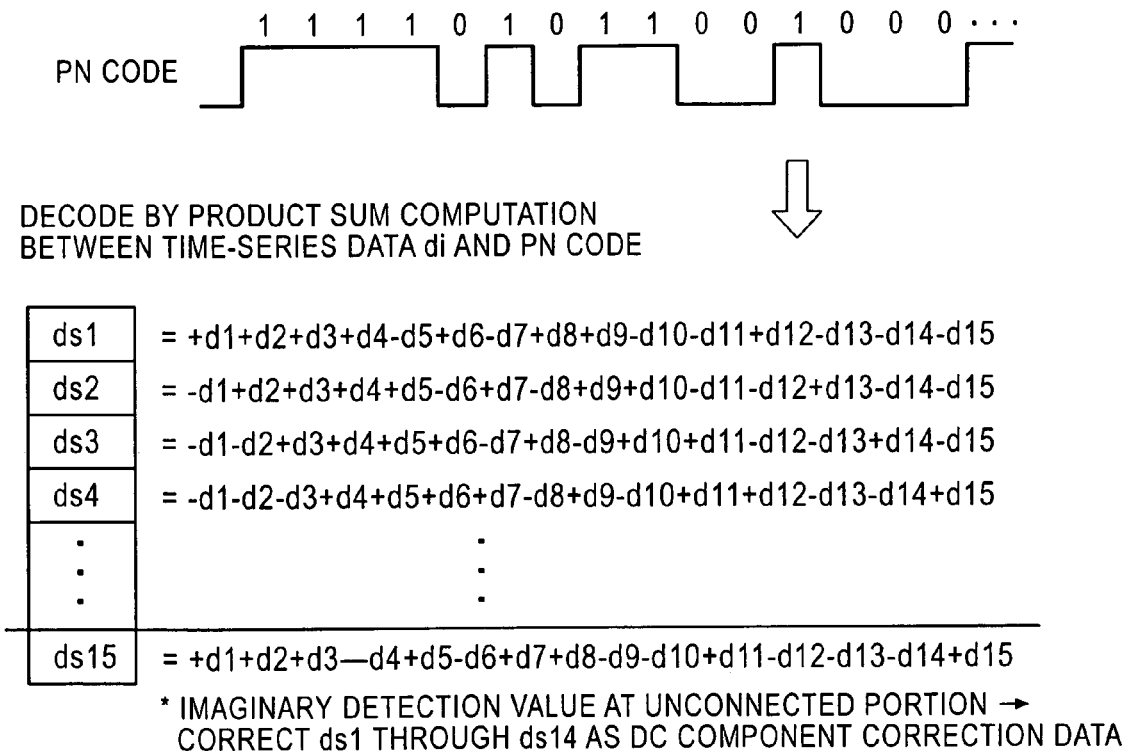
FIG. 31 schematically illustrates equations of product sum computation by the decoding computation circuit in the fourth embodiment.

In the decoding computation shown in FIG. 31, the voltage data ds1 through ds14 indicate the outputs corresponding to the actual capacitances at the corresponding intersections, while the voltage data ds15 is output as a reference value (no signal) since the imaginary column line is not actually connected.

Then, offset computation for associating the voltage data ds15 with the predetermined reference value dref is performed for each column line group. For example, the following computation is performed:

$$Ofs = ds15 - dref$$

$$dsaj = dsj - Ofs \ (1 \leq j \leq 14)$$

where the reference value dref is set as the reference for all the column line groups and the row lines, and the offset value Ofs is an offset amount used for correcting the voltage data for each column line group for each row line.

After determining the offset value Ofs for each column line group, the offset value Ofs is subtracted from the voltage data dsj ($1 \leq j \leq 14$) corresponding to the other column lines in the same column line group, thereby obtaining the corrected voltage data corresponding to the reference value dref in all the column line groups. As a result, a uniform shade of a two-dimensional image can be obtained.

A program for implementing the functions of the processors shown in FIGS. 1, 17, or 27 may be recorded on a computer-readable recording medium, and the program is read into a computer system and is executed, thereby performing measurement processing in the capacitor detecting circuit. The "computer system" includes an operating system (OS), hardware, such as peripheral devices, and a WWW system provided with a homepage providing environment (or display environment). The "computer-readable recording medium" includes portable media, such as flexible disks, magneto-optical disks, read only memory (ROM), and compact disc read only memory (CD-ROM), and storage devices, such as a hard disk contained in the computer system. The computer-readable recording medium also includes storage devices for temporarily storing programs, such as volatile memory (RAM) contained in the computer system, which serves as a server or a client when the program is sent via a communication line, such as a network, for example, the Internet, or a telephone line.

The above-described program may be transmitted to another computer system via a transmission medium or transmission waves in the transmission medium from the computer system storing the program in, for example, a storage device. The "transmission medium" for transmitting the program is a medium having a function of transmitting information, such as a communication line, such as a network (communication network), for example, the Internet, or a telephone line. The program may implement only part of the above-described functions, or may implement the functions in combination with another program stored in the computer system, i.e., the program may be a so-called "difference file (difference program).

What is claimed is:

1. A capacitance detecting circuit for detecting changes in capacitances at intersections between a plurality of column lines and a row line as voltages, comprising:
   code generating means for generating code having orthogonality in chronological order;
   column-line driving means for driving the plurality of column lines based on the code by dividing the column lines into a first column line group and a second column line group;
   capacitance detecting means connected to the row line, for converting a total of currents generated in capacitances at the intersections with the driven column lines into a voltage signal and outputting the converted voltage signal; and
   decoding computation means for determining the voltages corresponding to the capacitances at the intersections for each of the column line groups by performing product sum computation between the measured voltages and the code,
   wherein, in a period for detecting the capacitances, the column-line driving means drives one of the first column line group and the second column line group to shift from a first voltage to a second voltage and drives the other one of the first column line group and the second column line group to shift from the second voltage to the first voltage according to the code or information indicating the inversion of the code.

2. The capacitance detecting circuit according to claim 1, wherein the capacitance detecting means detects the capacitances at the intersections of an area capacitance sensor in which a plurality of row lines are disposed in accordance with the plurality of column lines in a matrix.

3. The capacitance detecting circuit according to claim 1, wherein the capacitance detecting means detects the capacitances at the intersections of a line capacitance sensor in which a row line is disposed in accordance with the plurality of column lines.

4. The capacitance detecting circuit according to claim 1, wherein the column-line driving means divides the period for detecting the capacitances into a first capacitance detection period and a second capacitance detection period, and in the first capacitance detection period, the column-line driving means drives the first column line group to rise from the first voltage to the second voltage and the second column line group to fall from the second voltage to the first voltage, and in the second capacitance detection period, the column-line driving means drives the first column line group to fall from the second voltage to the first voltage and the second column line group to rise from the first voltage to the second voltage.

5. A fingerprint sensor comprising the capacitance detecting circuit set forth in claim 4.

6. The capacitance detecting circuit according to claim 1, wherein the plurality of column lines are divided into a plurality of column line groups, each having a predetermined number of column lines, and
   the column-line driving means selectively changes the plurality of column line groups at predetermined intervals in chronological order, and drives the selected column line group by dividing the column lines into the first column line group and the second column line group based on the code without driving the column lines of the unselected column line groups.

7. The capacitance detecting circuit according to claim 6, wherein the column line group includes the number of column lines smaller than the number of bits of the code, and
   the decoding computation means performs product sum computation by associating the column lines of the column line group with the bits at predetermined positions and by associating an imaginary column line with the remaining bit so as to decode the voltages corresponding to the capacitances at the intersections.

8. A fingerprint sensor comprising the capacitance detecting circuit set forth in claim 6.

9. The capacitance detecting circuit according to claim 1, wherein the code generating means generates PN code having autocorrelation, and sequentially shifts a phase of the PN code by one bit so as to output the PN code in chronological order as the code.

10. The capacitance detecting circuit according to claim 1, wherein the code generating means sequentially generates Walsh orthogonal code having different orders of bit strings so as to output the Walsh orthogonal code in chronological order as the code.

11. A fingerprint sensor comprising the capacitance detecting circuit set forth in claim 1.

* * * * *